US012475497B2

(12) United States Patent
Kostas et al.

(10) Patent No.: US 12,475,497 B2
(45) Date of Patent: Nov. 18, 2025

(54) METHOD, SYSTEM, AND MEDIUM FOR GENERATING RECOMMENDATIONS UTILIZING AN EDGE-COMPUTING-BASED ASYNCHRONOUS COAGENT NETWORK

(71) Applicant: Adobe Inc., San Jose, CA (US)

(72) Inventors: James Kostas, Amherst, MA (US);
Georgios Theocharous, San Jose, CA (US)

(73) Assignee: Adobe Inc., San Jose, CA (US)

( * ) Notice: Subject to any disclaimer, the term of this patent is extended or adjusted under 35 U.S.C. 154(b) by 813 days.

(21) Appl. No.: 17/514,768

(22) Filed: Oct. 29, 2021

(65) Prior Publication Data
US 2023/0140004 A1    May 4, 2023

(51) Int. Cl.
*G06Q 30/0601* (2023.01)
*G06N 20/00* (2019.01)

(52) U.S. Cl.
CPC ......... *G06Q 30/0631* (2013.01); *G06N 20/00* (2019.01)

(58) Field of Classification Search
CPC .............. G06Q 30/0601–0645; G06Q 30/0631
USPC ....................................... 705/26.1–27.2, 26.7
See application file for complete search history.

(56) References Cited

U.S. PATENT DOCUMENTS

| 2016/0217388 A1* | 7/2016 | Okanohara ............ G06N 20/00 |
| 2018/0176317 A1* | 6/2018 | Hwang .................... H04L 67/55 |
| 2021/0004421 A1* | 1/2021 | Zadorojniy ......... G06F 18/2185 |
| 2022/0398500 A1* | 12/2022 | Singhal .................. G06N 3/098 |

OTHER PUBLICATIONS

Ruyan Wang et al., Edge and Cloud Collaborative Entity Recommendation Method towards the IoT Search, Sensors 2020, Internet of Things Based Multimedia Sensor Networks, Mar. 30, 2020 (Year: 2020).*
James Kostas, Chris Nota, and Philip Thomas. Asynchronous coagent networks. In International Conference on Machine Learning, pp. 5426-5435. PMLR, 2020.

(Continued)

*Primary Examiner* — Marissa Thein
*Assistant Examiner* — Anna Mae Mitros
(74) *Attorney, Agent, or Firm* — Keller Preece PLLC

(57) ABSTRACT

The present disclosure relates to systems, methods, and non-transitory computer-readable media that generate digital item recommendations for client devices utilizing coagent recommendation models of a distributed asynchronous coagent network. Indeed, in one or more embodiments, the disclosed systems operate on an edge computing device of a distributed asynchronous coagent network. In some cases, the disclosed systems utilize recommendation scores generated at the edge computing device via local coagents and additional recommendation scores received from other coagents of other edge computing devices to generate a digital item recommendation. In some cases, the disclosed systems progressively refines the recommendation as delayed scores from the other coagents are received. Further, in some embodiments, the disclosed systems update parameters of the local coagents using local policy gradients determined from responses to the generated recommendations.

19 Claims, 15 Drawing Sheets

(56) References Cited

OTHER PUBLICATIONS

Eugene Ie, Vihan Jain, Jing Wang, Sanmit Narvekar, Ritesh Agarwal, Rui Wu, Heng-Tze Cheng, Tushar Chandra, and Craig Boutilier. Slateq: A tractable decomposition for reinforcement learning with recommendation sets. In Proceedings of the Twenty-eighth International Joint Conference on Artificial Intelligence (IJCAI-19), pp. 2592-2599, Macau, China, 2019. See arXiv:1905.12767 for a related and expanded paper (with additional material and authors).

Minmin Chen, Alex Beutel, Paul Covington, Sagar Jain, Francois Belletti, and Ed H Chi. Top-k off-policy correction for a reinforce recommender system. In Proceedings of the Twelfth ACM International Conference on Web Search and Data Mining, pp. 456-464, 2019.

Ronald J Williams. Simple statistical gradient-following algorithms for connec-tionist reinforcement learning. Machine Learning, 8(3-4):229-256, 1992.

\* cited by examiner

METHOD, SYSTEM, AND MEDIUM FOR GENERATING RECOMMENDATIONS UTILIZING AN EDGE-COMPUTING-BASED ASYNCHRONOUS COAGENT NETWORK

BACKGROUND

Recent years have seen significant advancement in hardware and software platforms for providing digital items to client devices. For example, many conventional systems generate and provide recommendations to a client device for digital items (e.g., digital content items) based on certain preferences or characteristics associated with the client device. Thus, these conventional systems tailor the provision of a digital item based on its relevance to the client device. Some conventional systems generate recommendations for client devices using an edge computing environment to provide proximity between the systems and the client devices and to distribute the storage and computing resources required for implementation.

Despite these advances, however, conventional recommendation systems suffer from several technological shortcomings that result in inefficient, inflexible, and inaccurate operation. For instance, many conventional systems generate recommendations within an edge computing environment using an algorithm that requires the various edges to synchronize during the recommendation selection process. Such systems fail to leverage the potentially quick communication times offered by the proximity between an edge and a client device, as the edge typically must wait on signals from other, geographically distant edges before providing a recommendation to the client device. Thus, these conventional systems are often slow to communicate to client devices and consume significant computing resources (e.g., computer processing) before doing so via their synchronous algorithms. This problem is often exacerbated by systems that distribute the storage of their digital items across the edge computing environment so that a given edge must wait for communication from another edge to determine the relevance of the digital items stored at that edge.

In addition to the efficiency problems described above, conventional recommendation systems often suffer from flexibility issues. For example, conventional systems that rigidly rely on synchronization between edges for determining recommendations often encounter issues when synchronization does not occur. For instance, an edge may fail to communicate with sufficient speed, or network issues may prevent an edge from communicating at all. Many conventional systems fail to flexibly provide recommendations when such issues arise.

Further, conventional recommendations systems often fail to accurately generate recommendations that are relevant to a client device. To illustrate, some conventional systems generate recommendations within an edge computing environment using a "bag-of-algorithms" approach that involves patching together various different learning algorithms that are distributed across the environment. Often, the resulting combinations of algorithms are not theoretically grounded, so they diverge or exhibit undesirable properties. Accordingly, the conventional systems implementing this approach often fail to generate recommendations that accurately represent the interests or preferences of a client device.

These, along with additional problems and issues, exist with regard to conventional recommendation systems.

SUMMARY

One or more embodiments described herein provide benefits and/or solve one or more of the foregoing problems in the art with systems, methods, and non-transitory computer-readable media that generate digital item recommendations utilizing an asynchronous coagent network in an edge-computing environment. For example, in one or more embodiments, a system implements, at an edge of an asynchronous coagent network, a local coagent that learns and acts cooperatively with other coagents distributed across other edges of the network. To illustrate, in some embodiments, the system generates and provides a recommendation for a digital item based on a recommendation score generated using the local coagent and recommendation scores received from the other coagents. In some cases, the recommendation scores from the other coagents are delayed, so the system generates the recommendation without those recommendation scores and then progressively refines the recommendation as they are received. In some implementations, the system further implements gradient rules derived from a coagent policy gradient theorem to update the parameters of the local coagent using local policy gradients. In this manner, the system leverages the efficiency of edge computing while providing accurate digital item recommendations.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
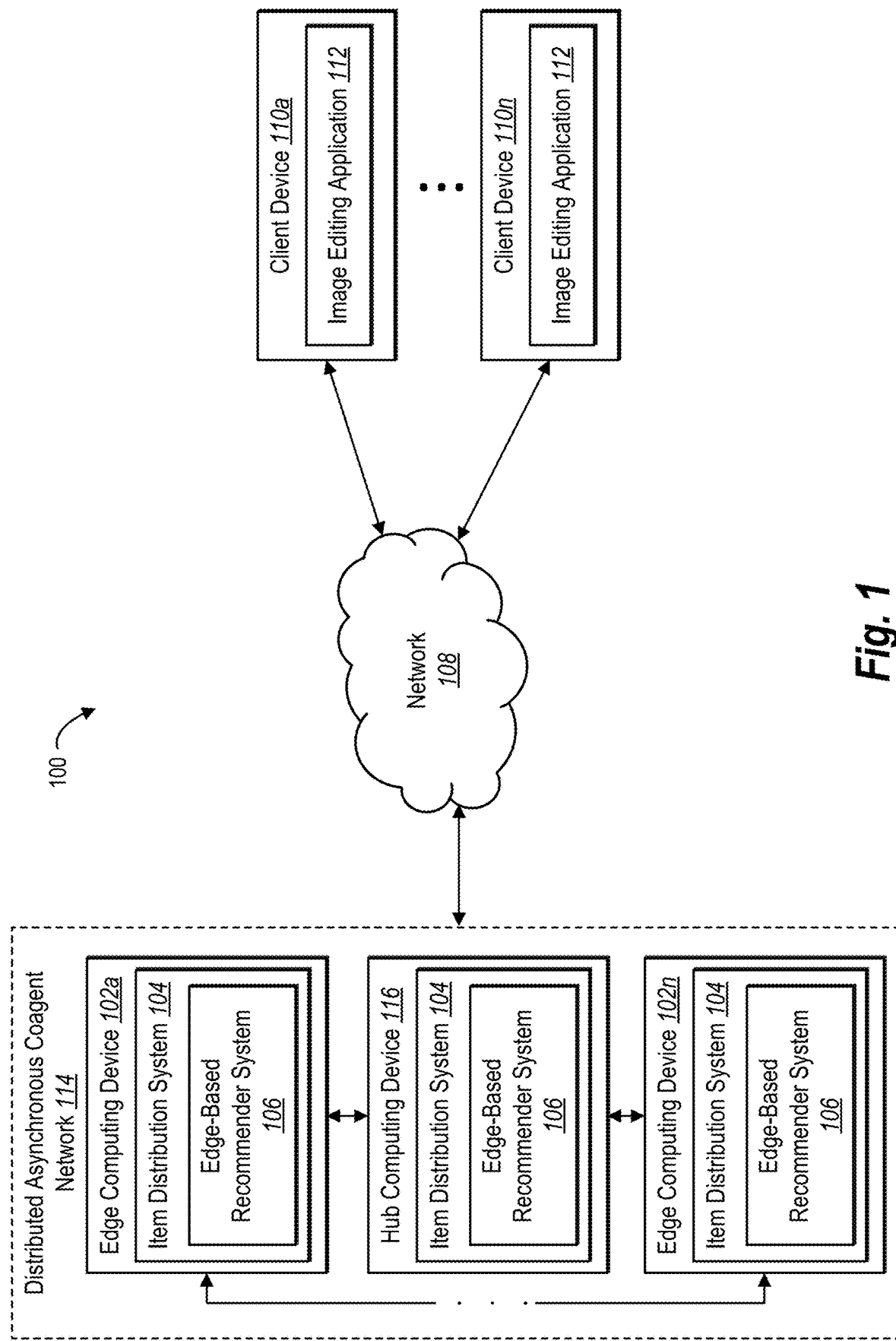
FIG. 1 illustrates an example environment in which an edge-based recommender system operates in accordance with one or more embodiments.

One or more embodiments described herein include an edge-based recommender system that utilizes an asynchronous network of coagent machine learning models that execute and learn collectively to generate recommendations within an edge-computing environment. To illustrate, in one or more embodiments, the edge-based recommender system generates, at an edge of the asynchronous network, recommendations for client devices that are proximate to that edge. In some embodiments, the edge-based recommender system communicates with coagent models from multiple edges of the asynchronous network to generate the recommendations but utilizes local policy gradients to separately update the parameters of its own coagent models. In some instances, to accommodate delays in communicating with the other (e.g., geographically distant) coagent models, the edge-based recommender system progressively refines the recommendations as those communications are received. In one or more embodiments, each coagent model of the asynchronous network includes a reinforcement learning model.

To provide an illustration, in one or more embodiments, the edge-based recommender system determines, at an edge computing device of a distributed asynchronous coagent network, a recommendation score for a digital item utilizing a local coagent recommendation model corresponding to the edge computing device and based on one or more item features of the digital item. Additionally, the edge-based recommender system receives, at the edge computing device and from a coagent recommendation model corresponding to additional edge computing devices of the distributed asynchronous coagent network, one or more additional recommendation scores for an additional digital item associated with the additional edge computing device. Utilizing the recommendation score and the additional recommendation score(s), the edge-based recommender system further generates a digital item recommendation at the edge computing device.

As just mentioned above, in one or more embodiments, the edge-based recommender system operates within a distributed asynchronous coagent network. In some embodiments, the distributed asynchronous coagent network includes a plurality of edge computing devices, each including at least one coagent recommendation model. In some cases, the distributed asynchronous coagent network also includes a hub computing device. Thus, in some implementations, the edge-based recommender system operates on one or more of the edge computing devices and/or the hub computing device.

In some instances, the edge computing devices and the hub computing device are geographically separated. In some cases, the edge computing devices collect data from and learn preferences for their corresponding geographic locations. Thus, in some implementations, the edge-based recommender system distributes its knowledge of the user base with which it interacts via the distribution of the edge computing devices.

Additionally, as mentioned above, in one or more embodiments, the edge-based recommender system generates a digital item recommendation for a client device. In particular, in some embodiments, the edge-based recommender system utilizes the distributed asynchronous coagent network to generate the digital item recommendation. In some implementations, the edge-based recommender system generates the digital item recommendation for the client device in response to receiving a query from the client device or in response to determining that the client device is otherwise accessing the distributed asynchronous coagent network. In some cases, the edge-based recommender system utilizes an edge computing device that is proximate to the client device to generate the digital item recommendation.

To provide an example of generating a digital item recommendation, in one or more embodiments, the edge-based recommender system generates a recommendation score for a digital item at an edge computing device. In particular, the edge-based recommender system generates the recommendation score utilizing a coagent recommendation model of the edge computing device (referred to as a local coagent recommendation model). In some cases, the edge-based recommender system generates the recommendation score based on one or more item features of the digital item. In some embodiments, the edge-based computing system generates the recommendation score based on one or more user attributes associated with the client device.

Further, in some implementations, the edge-based recommender system receives, at the edge computing device, one or more recommendation scores for one or more additional digital items from one or more additional edge computing devices of the distributed asynchronous coagent network. In one or more embodiments, the additional recommendation score includes a recommendation score generated via a coagent recommendation model of the additional edge computing device. In some cases, the edge-based recommender system provides one or more attributes associated with the client device from the edge computing device to the additional edge computing device for generation of the additional recommendation score.

In one or more embodiments, the edge-based recommender system utilizes the recommendation score generated at the edge computing device and the one or more additional recommendation scores received from the additional edge computing device(s) to generate the digital item recommendation. In some cases, the edge-based recommender system provides the digital item recommendation to the client device.

In some implementations, the edge-based recommender system receives the additional recommendation score(s) from the additional edge computing device after a time delay (e.g., due to the geographic distance between the edge computing devices). Accordingly, in some embodiments, the edge-based recommender system refines the digital item recommendation upon receiving the additional recommendation score(s). For example, in some cases, the edge-based recommender system generates an initial digital item recommendation utilizing the recommendation score generated at the edge computing device and then generates an updated digital item recommendation upon receiving the additional recommendation score(s) from the additional edge computing device(s).

As further mentioned above, in one or more embodiments, the edge-based recommender system updates the parameters of the local coagent recommendation model of the edge computing device using a local policy gradient. For instance, in some cases, the edge-based recommender system determines a response to the digital item recommendation from the client device. Further, the edge-based recommender system determines a local policy gradient for the local coagent recommendation model based on the response and uses the local policy gradient to modify the parameters of the local coagent recommendation model. In some cases, the edge-based recommender system further synchronizes the parameters of the local coagent recommendation model with the parameters of the coagent recommendation model of the additional edge computing device(s) periodically so that the parameters are shared across the distributed asynchronous coagent network.

The edge-based recommender system provides several advantages over conventional systems. For instance, the edge-based recommender system operates with improved efficiency when compared to conventional systems. In particular, by using a distributed asynchronous coagent network, the edge-based recommender system efficiently generates digital item recommendations for client devices. Indeed, the edge-based recommender system generates a digital item recommendation at an edge computing device without requiring communication from the other edge computing devices of the distributed asynchronous coagent network. Thus, the edge-based recommender system quickly provides digital item recommendations to client devices and reduces the computing resources required before communicating the digital item recommendations.

Further, the edge-based recommender system operates more flexibly than conventional systems. Indeed, by generating and providing digital item recommendations in an asynchronous manner, the edge-based recommender system flexibly accommodates scenarios where an edge computing device provides a delayed recommendation score (or fails to provide a recommendation score entirely due to network issues). In particular, in some cases, the edge-based recommender system flexibly determines and provides a digital item recommendation without the delayed recommendation score and updates the digital item recommendation as the delayed recommendation score is received. Further, by updating the parameters of coagent recommendation models with local policy gradients, the edge-based recommender system flexibly improves upon the recommendations generated at edge computing devices without the need to synchronize parameters across the distributed asynchronous coagent network.

Additionally, the edge-based recommender system operates with improved accuracy. In particular, the use of coagent recommendation models within a distributed asynchronous coagent network is theoretically grounded. Thus, the edge-based recommender system accurately determines which digital items are relevant to a client device, facilitating the generation of digital item recommendations that accurately represent the interests or preferences of the client device.

As illustrated by the foregoing discussion, the present disclosure utilizes a variety of terms to describe features and benefits of the edge-based recommender system. Additional detail is now provided regarding the meaning of these terms. For example, as used herein, the term "digital item" refers to digital data. In particular, in some embodiments, a digital item refers to digital data representing a particular item. For instance, in some cases, a digital item includes a digital representation of a real-world item (e.g., a digital representation of a product offered on an e-commerce site or a digital representation of a content item, such as a scan of a photo or document). In some instances, a digital item includes a digital content item (e.g., a digital photo, digital document, or another digitally created item of content).

As used herein, the term "item feature" refers to a characteristic of a digital item. In particular, in some embodiments, an item feature refers to a patent or latent attribute associated with a digital item. For example, in some implementations, an item feature includes, but is not limited to, an appearance of a digital item, a size of a digital item, a use of the digital item, a compatibility of a digital item with other items or platforms (digital or real-world), or a name or label of a digital item.

Further, as used herein, the term "digital item recommendation" refers to a recommendation of at least one digital item. In particular, in some embodiments, a digital item recommendation refers to a recommendation to a computing device of at least one digital item based on a determined relevance of the at least one digital item to the computing device. For instance, in some cases, a digital item recommendation includes a notification that is provided to a computing device regarding at least one digital item determined to be relevant to user attributes associated with the computing device. In some cases, a digital item recommendation includes a link for accessing a recommended digital item or accessing more information about the recommended digital item. In some implementations a digital item recommendation includes a selectable option for purchasing a recommended digital item.

As used herein, the term "user attribute" refers to a characteristic or attribute associated with a computing device. In particular, in some embodiments, a user attribute refers to a characteristic or attribute of the computing device or a user of the computing device. In one or more embodiments, a user attribute includes a preference or interest associated with the computing device, a location of the computing device, capabilities of the computing device, or history associated with the computing device (e.g., a history of actions). In some cases, a user attribute includes a query submitted by the computing device. In some implementations a user attribute further includes a characteristic or attribute of an environment (e.g., a real-world environment) associated with the client device.

Additionally, as used herein, the term "query" refers to a search submitted by a computing device. In particular, in some embodiments, a query includes a request for one or more digital items submitted by a computing device. For instance, in some implementations, a query includes a question in search of an answer contained in one or more digital items. In some cases, a query includes one or more search criteria indicating attributes of digital items to be returned in response to the query.

As used herein, the term "coagent recommendation model" refers to a computer-implemented model for generating digital item recommendations. In particular, in some embodiments a coagent recommendation model includes a computer-implemented model that generates a recommendation score for a digital item. For example, in some cases, a coagent recommendation model generates a recommendation score based on one or more item features of the digital item and/or one or more user attributes associated with a computing device for which the digital item recommendation is generated. In some cases, a coagent recommendation model includes a computer-implemented model that generates a digital item recommendation using one or recommendation scores. In some implementations, a coagent recommendation model includes, but is not limited to, a collaborative filtering model, a content-based filtering model, a hybrid recommendation model, or a reinforcement learning model.

Relatedly, as used herein, the term "local coagent recommendation model" refers to a coagent recommendation model that is local to (e.g., implemented on) a computing device. Indeed, in some embodiments, the edge-based recommender system operates on a computing device and utilizes a coagent recommendation model of that computing device. In other words, when describing a coagent recommendation model from the perspective of a given computing device, the term "local" refers to a coagent recommendation model that is implemented on that computing device as opposed to a coagent recommendation model implemented external to the computing device (e.g., implemented on another computing device). In some cases, the term "local" is also used to refer to an edge computing device. In such cases, the term "local" refers to an edge computing device that is interacting with a client device by receiving a query from the client device, determining user attributes of the client device, and/or providing a digital item recommendation to the client device.

Additionally, as mentioned, in some cases, a coagent recommendation model generates a recommendation score for a digital item. As used herein, the term "recommendation score" refers to a value or set of values generated by a coagent recommendation model for a digital item. In particular, in some embodiments, a recommendation score refers to a value or set of values representing a quantitative measure of a relationship between a digital item and a computing device. For instance, in some cases, a recommendation score includes a value or set of values that indicate a relevance of a digital item to a computing device based on one or more item features of the digital item and/or one or more user attributes associated with the computing device. Indeed, in some cases, a recommendation score includes a scalar. In some implementations, however, a recommendation score includes a vector of values.

In one or more embodiments, a coagent recommendation model includes one or more parameters. As used herein, the term "parameter" refers to a variable that is internal to a computer-implemented model, such as a coagent recommendation model. In particular, in some embodiments, a parameter refers to a variable that affects the operation of the corresponding computer-implemented model. For instance, in some cases, a parameter includes a weight of a function of a computer-implemented model that affects the outcome generated by the model.

As used herein, the term "distributed asynchronous coagent networks" refers to a collection of computing devices that communicate with one another. In particular, in some embodiments, a distributed asynchronous coagent networks refers to a distributed network of computing devices that generates digital item recommendations for other computing devices (e.g., client devices). In some cases, the computing devices of the distributed asynchronous coagent networks generate digital item recommendations in an asynchronous manner. For example, in some cases, a computing device of the distributed asynchronous coagent network generates a digital item recommendation before receiving communications from one or more of the other computing devices of the distributed asynchronous coagent network. In one or more embodiments, a distributed asynchronous coagent network includes a plurality of edge computing devices and at least one hub computing device. In some cases, the edge computing devices generate the digital item recommendations and interact with client devices (e.g., by receiving queries and providing digital item recommendations). In some implementations, the hub computing device facilitates communication and synchronization among the edge computing devices. In one or more embodiments, the edge computing devices and the hub computing device are distributed geographically across large distances.

Additionally, as used herein, the term "synchronization event" refers to an instance of synchronization between edge computing devices of a distributed asynchronous coagent network. In particular, in some embodiments, a synchronization event refers to an instance of synchronizing parameters of coagent recommendation models of the edge computing devices of a distributed asynchronous coagent network. For instance, in some cases, a synchronization event includes a sequence of communications among edge computing devices (and a hub computing device) that facilitates synchronization of the parameters of the coagent recommendation models included in the distributed asynchronous coagent network.

Further, as used herein, the term "parameter update" refers to a communication for use in facilitating synchronization among edge computing devices of a distributed asynchronous coagent network. In particular, in some embodiments, a parameter update refers to a communication from a hub computing device to the edge computing devices that facilitates synchronization among the edge computing devices. For instance, in some cases, a parameter update includes modifications to be made to the parameters of one or more of the coagent recommendation models of the edge computing devices to facilitate synchronization.

In one or more embodiments, the term "gradient" (or "policy gradient") refers to a change to a parameter of a computer-implemented model. In particular, in some embodiments, a gradient refers to a change to a parameter of a coagent recommendation model. For instance, in some cases, a gradient includes a value by which a parameter is modified. In some cases, a gradient refers to a set of values corresponding to a set of parameters of a coagent recommendation model (e.g., each value indicating a change to a corresponding parameter). Relatedly, in one or more embodiments, the term "local gradient" (or "local policy gradient") refers to a gradient that corresponds to a local coagent recommendation model.

Additional detail regarding the edge-based recommender system will now be provided with reference to the figures. For example, FIG. 1 illustrates a schematic diagram of an exemplary system 100 in which an edge-based recommender system 106 operates. As illustrated in FIG. 1, the system 100 includes a distributed asynchronous coagent network 114 (consisting of edge computing devices 102*a*-102*n* and a hub computing device 116), a network 108, and client devices 110*a*-110*n*.

Although the system 100 of FIG. 1 is depicted as having a particular number of components, the system 100 is capable of having any number of additional or alternative components (e.g., any number of edge computing devices, hub computing devices, client devices, or other components in communication with the edge-based recommender system 106 via the network 108). Similarly, although FIG. 1 illustrates a particular arrangement of the distributed asynchronous coagent network 114 (e.g., the edge computing devices 102*a*-102*n* and the hub computing device 116 within the distributed asynchronous coagent network 114), the network 108, and the client devices 110*a*-110*n*, various additional arrangements are possible.

The edge computing devices 102*a*-102*n*, the hub computing device 116, the network 108, and the client devices 110*a*-110*n* are communicatively coupled with each other either directly or indirectly (e.g., through the network 108 discussed in greater detail below in relation to FIG. 10). Indeed, while FIG. 1 illustrates the edge computing devices 102a-102n and the hub computing device 116 of the distributed asynchronous coagent network 114 communicating directly with one another, these devices communicate over the network 108 in one or more embodiments. Moreover, the edge computing devices 102a-102n, the hub computing device 116, and the client devices 110a-110n include one of a variety of computing devices (including one or more computing devices as discussed in greater detail with relation to FIG. 10).

As mentioned above, the system 100 includes the distributed asynchronous coagent network 114. As shown, the distributed asynchronous coagent network 114 includes a distributed network of the edge computing devices 102a-102n and the hub computing device 116. In one or more embodiments, the distributed asynchronous coagent network 114 generates digital item recommendations for client devices. For instance, in one or more embodiments, the distributed asynchronous coagent network 114 receives a query from a client device (e.g., one of the client devices 110a-110n) and provides a digital item recommendation to the client device in return. In one or more embodiments, an edge computing device that is geographically proximate to the client device receives the query and generates and provides the digital item recommendation. Indeed, in one or more embodiments, the edge computing devices 102a-102n of the distributed asynchronous coagent network 114 are distributed across a geographic area and communicate with client devices that are also distributed across the geographic area. Accordingly, in some implementations, the distributed asynchronous coagent network 114 communicates with a client device via an edge computing device that is geographically proximate to the client device. It should be noted, however, that the other edge computing devices and/or the hub computing device 116 of the distributed asynchronous coagent network 114 participate in the process of generating the digital item recommendation in some embodiments.

In one or more embodiments, the edge computing devices 102a-102n generate, store, receive, and/or transmit data, including digital items and digital item recommendations. For example, in some embodiments, each of the edge computing devices 102a-102n stores at least one digital item. In some cases, the edge computing devices 102a-102n transmit recommendation scores for their corresponding digital items to one another (e.g., either directly or via the hub computing device 116). Further, in some instances, at least one of the edge computing devices 102a-102n transmits a digital item recommendation generated from the recommendation scores to a client device (e.g., one of the client devices 110a-110n). In one or more embodiments, each of the edge computing devices 102a-102n comprises a server device. For example, in some embodiments, each of the edge computing devices 102a-102n comprises a data server. In some implementations, each of the edge computing devices 102a-102n comprises a communication server or a web-hosting server.

In some embodiments, the hub computing device 116 generates, stores, receives, and/or transmits data, including data related to parameters of the models implemented via the edge computing devices 102a-102n. For instance, in some cases, the hub computing device 116 receives gradients from each of the edge computing devices 102a-102n during a synchronization event and transmits a parameter update to the edge computing devices 102a-102n in return. In one or more embodiments, the hub computing device 116 comprises a server device. For example, in some embodiments, the hub computing device 116 comprises a data server. In some implementations, the hub computing device 116 comprises a communication server or a web-hosting server.

As shown in FIG. 1, each of the edge computing devices 102a-102n and the hub computing device 116 include an item distribution system 104. In one or more embodiments, the item distribution system 104 facilitates the distribution of digital items. For instance, in some embodiments, the item distribution system 104 of the edge computing devices 102a-102n provides digital items or access to digital items to client devices. In some implementations, the item distribution system 104 of the hub computing device 116 provides digital items to the edge computing devices 102a-102n for storage.

Additionally, as shown in FIG. 1, each of the edge computing devices 102a-102n and the hub computing device 116 includes the edge-based recommender system 106. In one or more embodiments, the edge-based recommender system 106 utilizes the edge computing devices 102a-102n and the hub computing device 116 to implement coagent recommendation models for generating digital item recommendations. In particular, in some embodiments, the edge-based recommender system 106 utilizes the edge computing devices 102a-102n to execute coagent recommendation models for generating digital item recommendations. In some cases, the edge-based recommender system 106 utilizes the hub computing device 116 to synchronize the coagent recommendation models of the edge computing devices 102a-102n during synchronization events to improve the digital item recommendations.

The following provides an illustration of the edge-based recommender system 106 operating on an edge computing device of the distributed asynchronous coagent network 114. In one or more embodiments, the edge-based recommender system 106 determines, via an edge computing device (e.g., one of the edge computing devices 102a-102n), a recommendation score for a digital item utilizing a local coagent recommendation model corresponding to the edge computing device and based on one or more item features of the digital item. Further, the edge-based recommender system 106 receives, via the edge computing device and from a coagent recommendation model corresponding to an additional edge computing device (a different edge computing device from the edge computing devices 102a-102n), an additional recommendation score for an additional digital item associated with the additional edge computing device. Via the edge computing device, the edge-based recommender system 106 generates a digital item recommendation utilizing the recommendation score and the additional recommendation score.

In one or more embodiments, the client devices 110a-110n include computing devices that are capable of receiving, accessing, and/or displaying digital items. For example, the client devices 110a-110n include one or more of smartphones, tablets, desktop computers, laptop computers, head-mounted-display devices, and/or other electronic devices. In some instances, the client devices 110a-110n include one or more applications (e.g., the client application 112) that is capable of receiving, accessing, and/or displaying digital items. For example, in one or more embodiments, the client application 112 includes a software application installed on the client devices 110a-110n. Additionally, or alternatively, the client application 112 includes a software application hosted on the edge computing devices 102a-102n and/or the hub computing device 116 (and supported by the item distribution system 104), which is accessible by the client devices 110a-110n through another application, such as a web browser.

The edge-based recommender system 106 can be implemented in whole, or in part, by the individual elements of the system 100. Indeed, although FIG. 1 illustrates the edge-based recommender system 106 implemented with regard to the edge computing devices 102a-102n and the hub computing device 116, different components of the edge-based recommender system 106 can be implemented by a variety of devices within the system 100. For example, one or more (or all) components of the edge-based recommender system 106 can be implemented by a different computing device (e.g., one of the client devices 110a-110n) or a separate computing device from the computing devices included in the distributed asynchronous coagent network 114. In particular, in one or more embodiments, the edge-based recommender system 106 is resident on and implemented entirely by a client device (e.g., a mobile computing device). In such cases, the client device may download, or otherwise obtain, the edge-based recommender system 106 from one of the edge computing devices 102a-102n or the hub computing device 116. Example components of the edge-based recommender system 106 will be described below with regard to FIG. 8.

Figure 2:
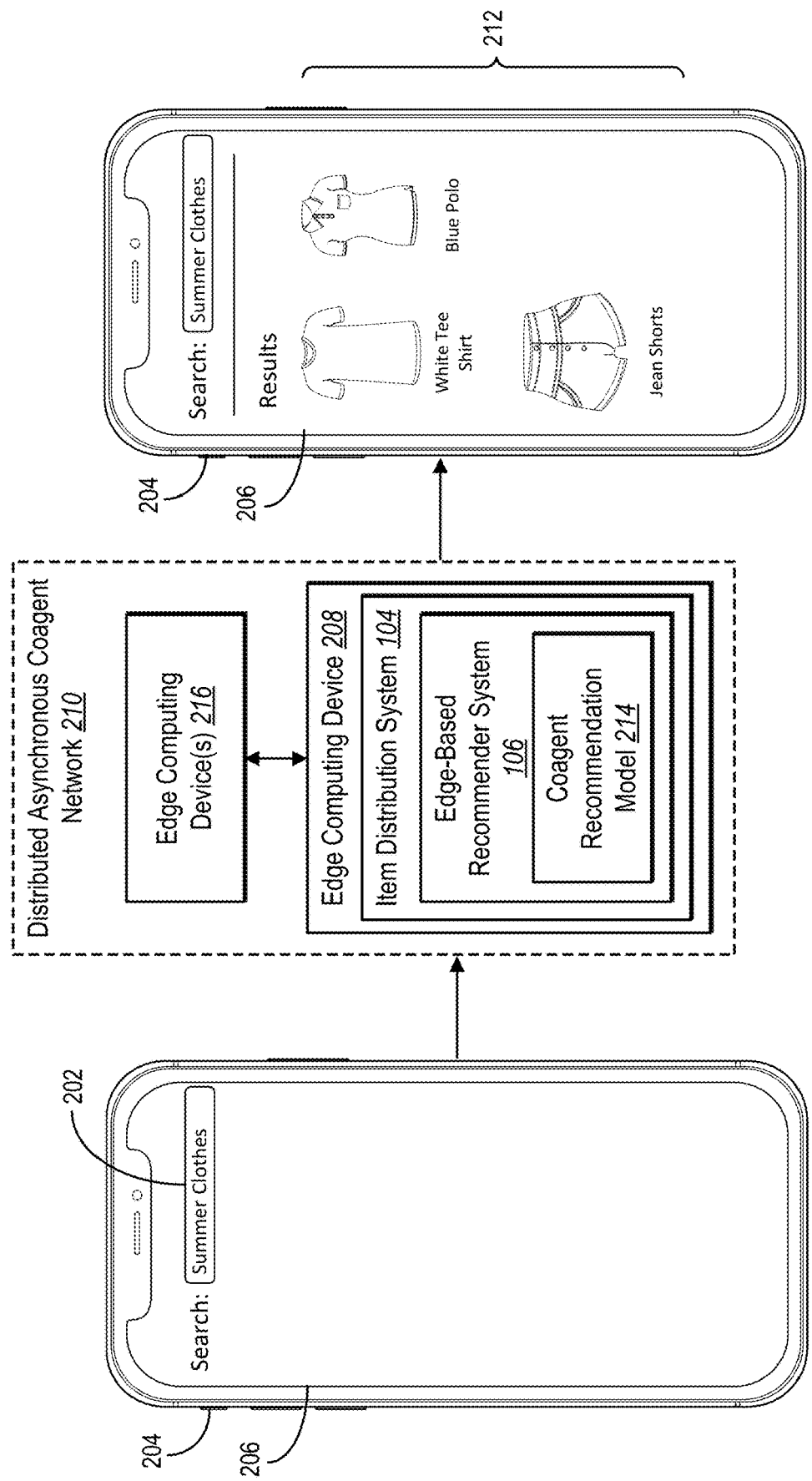
FIG. 2 illustrates an overview diagram of the edge-based recommender system generating a digital item recommendation for a client device in accordance with one or more embodiments.

As mentioned above, in one or more embodiments, the edge-based recommender system 106 generates digital item recommendations for client devices. FIG. 2 illustrates an overview diagram of the edge-based recommender system 106 generating a digital item recommendation for a client device in accordance with one or more embodiments.

In particular, as shown in FIG. 2, the edge-based recommender system 106 receives a query 202 from a client device 204 (e.g., a query requesting one or more digital items related to the search term "summary clothes). As shown, the edge-based recommender system 106 receives the query 202 via a graphical user interface 206 displayed the client device 204. Indeed, in one or more embodiments, the edge-based recommender system 106 provides the graphical user interface 206 for display on the client device 204 and detects the query 202 entered via the graphical user interface 206.

As shown in FIG. 2, the edge-based recommender system 106 receives the query 202 from the client device 204 at an edge computing device 208 of a distributed asynchronous coagent network 210. For example, in one or more embodiments, the edge-based recommender system 106 receives the query 202 at an edge computing device that is geographically proximate to the client device 204.

As further shown in FIG. 2, the edge-based recommender system 106 provides a digital item recommendation 212 from the edge computing device 208 to the client device 204 in response to receiving the query 202. In particular, the edge-based recommender system 106 the digital item recommendation 212 for display within the graphical user interface 206.

In one or more embodiments, the edge-based recommender system 106 generates the digital item recommendation 212 at the edge computing device 208 in response to receiving the query 202. For example, as shown in FIG. 2, the edge-based recommender system 106 utilizes a coagent recommendation model 214 of the edge computing device 208 (e.g., a local coagent recommendation model) to generate the digital item recommendation 212. To illustrate, in one or more embodiments, the edge-based recommender system 106 utilizes the coagent recommendation model 214 to generate a recommendation score for a corresponding digital item and generates the digital item recommendation 212 using the recommendation score. Though FIG. 2 illustrates the edge-based recommender system 106 utilizing one coagent recommendation model of the edge computing device 208, the edge-based recommender system 106 utilizes a plurality of coagent recommendation models from the same edge computing device in some implementations.

As further shown in FIG. 2, in some embodiments, the edge-based recommender system 106 communicates with one or more additional edge computing device(s) 216 of the distributed asynchronous coagent network 210 to generate the digital item recommendation 212. For instance, in one or more embodiments, the edge-based recommender system 106 receives, at the edge computing device 208, one or more additional recommendation scores for one or more additional digital items from the additional edge computing device(s) 216. In some cases, the additional recommendation score(s) include recommendation scores generated via coagent recommendation models of the additional edge computing device(s) 216. Thus, in some implementations, the edge-based recommender system 106 generates the digital item recommendation 212 at the edge computing device 208 utilizing the recommendation score generated via the coagent recommendation model 214 of the edge computing device 208 and the additional recommendation score (s) generated via coagent recommendation models of the additional edge computing device(s) 216. More detail regarding the use of recommendation scores generated via coagent recommendation models to generate digital item recommendations will be provided below with reference to FIGS. 3-5.

Though FIG. 2 illustrates the edge-based recommender system 106 generating the digital item recommendation 212 in response to receiving the query 202, the edge-based recommender system 106 generates a digital item recommendation without receiving a query in some embodiments. For instance, in some cases, the edge-based recommender system 106 generates a digital item recommendation for a client device in response to determining that the client device is accessing the distributed asynchronous coagent network 210 (e.g., accessing one of the edge computing devices or a hub computing device of the distributed asynchronous coagent network 210) or a third-party system associated with the distributed asynchronous coagent network 210. To illustrate, in one or more embodiments, the edge-based recommender system 106 determines that a client device is accessing an e-commerce website hosted by a computing device of the distributed asynchronous coagent network 210 or hosted on a third-party platform associated with the distributed asynchronous coagent network 210. Accordingly, the edge-based recommender system 106 provides a digital item recommendation to the client device to recommend one or more products offered on the e-commerce website.

Further, though FIG. 2 illustrates the edge-based recommender system 106 receiving the query 202 and generating the digital item recommendation 212 at the same edge computing device (e.g., the edge computing device 208), the edge-based recommender system 106 receives a query and generates the corresponding digital item recommendation via different edge computing devices in some embodiments. To illustrate, in at least one implementation, the edge-based recommender system 106 receives a query at a first edge computing device that is geographically proximate to the client device and generates the corresponding digital item recommendation at a second edge computing device that is geographically proximate to the client device. For instance, in some cases, the second edge computing device is closer to the client device and becomes available to generate the digital item recommendation after the query is received. Thus, the client device can interact with multiple edge computing devices of the distributed asynchronous coagent network 210 to obtain a digital item recommendation in some embodiments.

Figure 3:
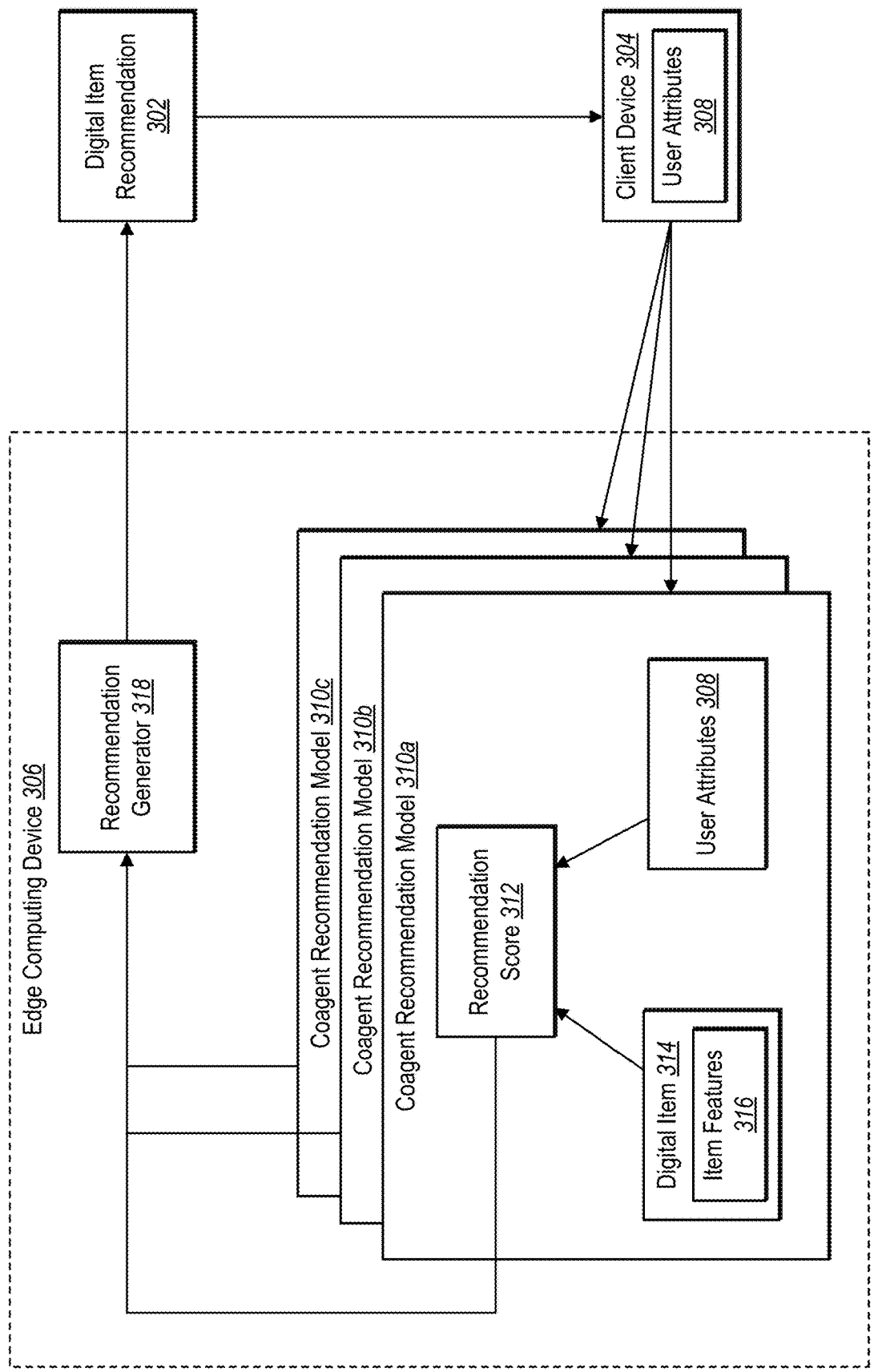
FIG. 3 illustrates a diagram for utilizing an edge computing device of a distributed asynchronous coagent network to generate a digital item recommendation in accordance with one or more embodiments.

As mentioned above, in one or more embodiments, the edge-based recommender system 106 utilizes an edge computing device of a distributed asynchronous coagent network to generate a digital item recommendation. FIG. 3 illustrates a diagram for utilizing an edge computing device of a distributed asynchronous coagent network to generate a digital item recommendation in accordance with one or more embodiments. It should be noted that, while FIG. 3 illustrates use of a single edge computing device to generate a digital item recommendation, the edge-based recommender system 106 utilizes multiple edge computing devices in some embodiments as will be discussed further with reference to FIG. 4.

Indeed, as shown in FIG. 3, the edge-based recommender system 106 generates a digital item recommendation 302 for a client device 304. In particular, the edge-based recommender system 106 generates the digital item recommendation 302 at an edge computing device 306 of a distributed asynchronous coagent network. In one or more embodiments, the edge computing device 306 includes an edge computing device of the distributed asynchronous coagent network that is geographically proximate to the client device 304.

Additionally, as shown in FIG. 3, the edge-based recommender system 106 utilizes coagent recommendation models 310a-310c of the edge computing device 306 (e.g., local coagent recommendation models) for generating the digital item recommendation 302. Though FIG. 3 illustrates a particular number of coagent recommendation models, the edge computing device 306 includes various numbers of coagent recommendation models in different embodiments. In one or more embodiments, each of the coagent recommendation models 310a-310c of the edge computing device 306 include a reinforcement learning model. For example, in some implementations, each of the coagent recommendation models 310a-310c includes the reinforcement learning model described in U.S. patent application Ser. No. 17/367,134 filed on Jul. 2, 2021, entitled GENERATING DIGITAL RECOMMENDATIONS UTILIZING COLLABORATIVE FILTERING, REINFORCEMENT LEARNING, AND INCLUSIVE SETS OF NEGATIVE FEEDBACK, which is incorporated herein by reference in its entirety.

In one or more embodiments, the edge-based recommender system 106 utilizes the coagent recommendation models 310a-310c for generating the digital item recommendation 302 by utilizing each of the coagent recommendation models 310a-310c to generate a recommendation score for a corresponding digital item. For example, as shown in FIG. 3, the edge-based recommender system 106 utilizes the coagent recommendation model 310a to generate a recommendation score 312 for the digital item 314. Indeed, in some implementations, each of the coagent recommendation models 310a-310c of the edge computing device 306 is associated with one or more digital items and generates a recommendation score for the digital item(s). In some cases, the digital item(s) associated with a coagent recommendation model is different than the digital item(s) associated with the other coagent recommendation models of the edge computing device 306. In some cases, the digital items associated with the coagent recommendation models 310a-310c include digital items that are stored locally at the edge computing device 306 or are otherwise accessible to the edge computing device 306.

To illustrate, as shown in FIG. 3, the edge-based recommender system 106 utilizes the coagent recommendation model 310a to generate the recommendation score 312 for the digital item 314 based on item features 316 of the digital item 314. In one or more embodiments, the edge-based recommender system 106 determines the item features 316 via an analysis of the digital item 314. In some cases, the edge-based recommender system 106 stores a list containing the item features 316 and accesses the list when generating the recommendation score 312.

As further shown in FIG. 3, the edge-based recommender system 106 utilizes the coagent recommendation model 310a to generate the recommendation score 312 based on user attributes 308 of the client device 304. Indeed, in one or more embodiments, the edge-based recommender system 106 determines the user attributes 308 of the client device 304 for use in generating the digital item recommendation 302. In some cases, the edge-based recommender system 106 determines the user attributes 308 by receiving the user attributes 308 directly from the client device 304. In some cases, the edge-based recommender system 106 determines the user attributes 308 by monitoring the client device 304 (e.g., monitoring activity of the client device 304) or by accessing a profile associated with the client device 304 (e.g., a user profile or a device profile associated with the client device 304). In some implementations, the user attributes 308 include a query submitted by the client device 304 as discussed above with reference to FIG. 2.

In one or more embodiments, the edge-based recommender system 106 similarly uses the coagent recommendation models 310b-310c to generate recommendation scores for their respective digital items based on one or more item features of those digital items and based on the user attributes 308 of the client device 304.

As shown, in FIG. 3, the edge-based recommender system 106 further utilizes a recommendation generator 318 of the edge computing device 306 to generate the digital item recommendation 302. In particular, as shown, the edge-based recommender system 106 utilizes the recommendation generator 318 to generate the digital item recommendation 302 based on the recommendation scores provided by the coagent recommendation models 310a-310c. In some cases, the recommendation generator 318 generates the digital item recommendation 302 by ranking the digital items based on their corresponding recommendation scores and generating the digital item recommendation 302 using one or more of the top-ranked digital items. In some implementations, the recommendation generator 318 implements a softmax function using the recommendation scores as the inputs and generating the digital item recommendation 302 based on the output of the softmax function. In some cases, the recommendation generator 318 implements a combination of a softmax function and a sort function.

In some embodiments, the recommendation generator 318 implements machine learning to generate the digital item recommendation 302. In particular, in some cases, the recommendation generator 318 is a parameterized model. For instance, in one or more embodiments, the recommendation generator 318 includes a coagent recommendation model. Accordingly, in some implementations, the recommendation generator 318 includes a reinforcement learning model, such as the reinforcement learning model described above with reference to the coagent recommendation models 310a-310c.

Thus, the edge-based recommender system 106 generates the digital item recommendation 302 for the client device 304. Further, as shown in FIG. 3, the edge-based recommender system 106 provides the digital item recommendation 302 to the client device 304 (e.g., for display within a graphical user interface of the client device 304).

Figure 4:
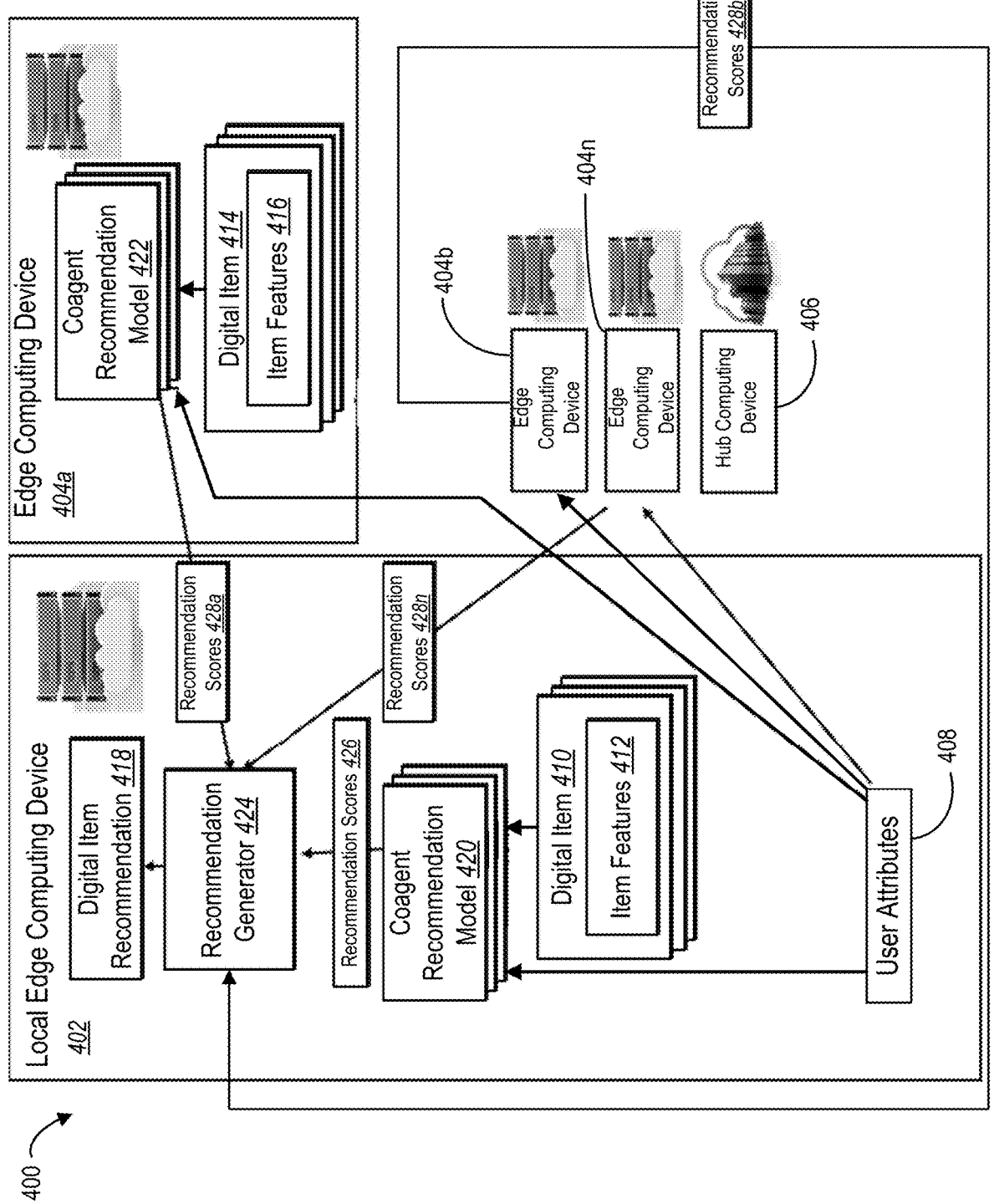
FIG. 4 illustrates a diagram for generating a digital item recommendation using coagent recommendation models of multiple edge computing devices in accordance with one or more embodiments.

As mentioned above, in one or more embodiments, the edge-based recommender system 106 utilizes coagent recommendation models of multiple edge computing devices of a distributed asynchronous coagent network to generate digital item recommendations for client devices. FIG. 4 illustrates a diagram for generating a digital item recommendation using coagent recommendation models of multiple edge computing devices in accordance with one or more embodiments.

As shown in FIG. 4, the edge-based recommender system 106 operates on an edge computing device 402 (referred to as the "local edge computing device") of a distributed asynchronous coagent network 400 to generate a digital item recommendation 418. In one or more embodiments, the edge computing device 402 includes an edge computing device that is geographically proximate to the client device for which the digital item recommendation 418 is generated. As shown, the distributed asynchronous coagent network 400 further includes edge computing devices 404a-404n and a hub computing device 406. As mentioned above, in one or more embodiments, the edge-based recommender system 106 also operates on the edge computing devices 404a-404n and/or the hub computing device 406.

As illustrated by FIG. 4, the edge-based recommender system 106 determines user attributes 408 of the client device for which the digital item recommendation 418 is generated. In particular, the edge-based recommender system 106 determines the user attributes 408 at the edge computing device 402. Further, the edge-based recommender system 106 determines, at the edge computing device 402, item features for the digital items associated with (e.g., stored at) the edge computing device 402. For example, as shown, the edge-based recommender system 106 determines item features 412 for the digital item 410.

Additionally, as shown in FIG. 4, the edge-based recommender system 106 utilizes the coagent recommendation models (e.g., local coagent recommendation models) of the edge computing device 402 to generate recommendation scores 426 for the digital items associated with the edge computing device 402. In particular, the edge-based recommender system 106 utilizes the coagent recommendation models to generate the recommendation scores 426 based on the user attributes 408 and the item features of the digital items. To illustrate, FIG. 4 shows the edge-based recommender system 106 utilizing the coagent recommendation model 420 to generate a recommendation score for the digital item 410 based on the item features 412 of the digital item 410 and the user attributes 408. As shown in FIG. 4, the edge-based recommender system 106 provides the recommendation scores 426 to a recommendation generator 424 of the edge computing device 402.

As further shown in FIG. 4, the edge-based recommender system 106 provides the user attributes 408 from the edge computing device 402 to the edge computing devices 404a-404n. In particular, FIG. 4 shows the edge-based recommender system 106 providing the user attributes 408 directly to the edge computing devices 404a-404n. In some implementations, however, the edge-based recommender system 106 provides the user attributes 408 to the edge computing devices 404a-404n via the hub computing device 406.

Additionally, as illustrated in FIG. 4, the edge-based recommender system 106 receives, at the edge computing device 402, recommendation scores 428a-428n generated at the edge-computing devices 404a-404n. In particular, the edge-based recommender system 106 receives the recommendation scores 428a-428n at the recommendation generator 424 of the edge computing device 402. Though FIG. 4 shows the edge-based recommender system 106 receiving the recommendation scores 428a-428n directly from the edge computing devices 404a-404n, the edge-based recommender system 106 receives the recommendation scores 428a-428n via the hub computing device 406 in some implementations.

In one or more embodiments, the recommendation scores 428a-428n include recommendation scores generated by coagent recommendation models of the edge computing devices 404a-404n, respectively. Indeed, in some embodiments, the edge-based recommender system 106 generates the recommendation scores 428a-428n at the edge computing devices 404a-404n using their corresponding coagent recommendation models. In some embodiments, the edge-based recommender system 106 generates the recommendation scores 428a-428n for the digital items associated with (e.g., stored at) the edge computing devices 404a-404n, respectively.

To provide an illustration, as shown in FIG. 4, the edge-based recommender system 106 utilizes the coagent recommendation model 422 to generate a recommendation score for a digital item 414 at the edge computing device 404a. In particular, the edge-based recommender system 106 generates the recommendation score based on the user attributes 408 provided via the edge computing device 402 and item features 416 determined for the digital item 414. The edge-based recommender system 106 likewise generates additional recommendation scores for other digital items associated with the edge computing device 404a utilizing corresponding coagent recommendation models of the edge computing device 404a. Thus, the edge-based recommender system 106 generates the recommendation scores 428a at the edge computing device 404a and provides the recommendation scores 428a to the edge computing device 402. The edge-based recommender system 106 similarly generates the recommendations scores 428b-428n for digital items associated with the edge computing devices 404b-404n, respectively, utilizing the coagent recommendation models of the edge computing devices 404b-404n.

As further shown in FIG. 4, the edge-based recommender system 106 generates the digital item recommendation 418 at the edge computing device 402 using the recommendation generator 424 (e.g., another coagent recommendation model) of the edge computing device 402. In particular, the edge-based recommender system 106 generates the digital item recommendation 418 based on the recommendation scores 426 generated at the edge computing device 402 and the recommendation scores 428a-428n received from the edge computing devices 404a-404n. Thus, the edge-based recommender system 106 generates the digital item recommendation 418 for a client device using the distributed asynchronous coagent network 400.

As mentioned above, in some cases, the edge computing device 402 and the other edge computing devices 404a-404n are geographically distributed and collect data from and learn preferences for their corresponding geographic locations. Indeed, some geographic locations can have different preferences due to trends or the culture associated with those locations. Accordingly, by using recommendation scores from various edge computing devices of the distributed asynchronous coagent network 400, the edge-based recommender system 106 leverages the distributed knowledge of the distributed asynchronous coagent network 400.

In some cases, the edge-based recommender system 106 applies a weight to at least one of the recommendation scores 426 and/or at least one of the recommendation scores 428a-428n before generating the digital item recommendation 418. For example, in some cases, the edge-based recommender system 106 determines that a particular edge computing device is associated with digital items that are popular, widely used, or trending. Thus, the edge-based recommender system 106 can apply weights to the recommendation scores from that edge computing device that increases the chance that the corresponding digital items are selected for the digital item recommendation 418. In some cases, the edge-based recommender system 106 applies a weight to the recommendation scores generated at the local edge computing device based on determining that the preferences of the corresponding area have been better captured by that edge computing device, making it more suitable for recommending relevant digital items.

In some embodiments, the edge-based recommender system 106 applies a weight to the recommendation scores from an edge computing device based on a context of the digital item recommendation to be generated. Indeed, based on the context of the digital item recommendation, the edge-based recommender system 106 can determine that recommendation scores from a particular edge computing device are more or less valuable. Accordingly, the edge-based recommender system 106 applies a weight to those recommendation scores to reflect that increased/decreased value.

In one or more embodiments, rather than using the edge computing device 402 to generate a digital item recommendation, the edge-based recommender system 106 utilizes one of the other edge computing devices 404a-404n to generate the digital item recommendation (e.g., where one of the other edge computing devices 404a-404n is more geographically proximate to the client device). Accordingly, the edge-based recommender system 106 receives, at the edge computing device 402, user attributes for the client device from the other edge computing device that will generate the digital item recommendation. Further, the edge-based recommender system 106 utilizes the edge computing device 402 to generate recommendation scores for its associated digital items and provide the recommendation scores to the other edge computing device for generation of the digital item recommendation.

Figure 5:
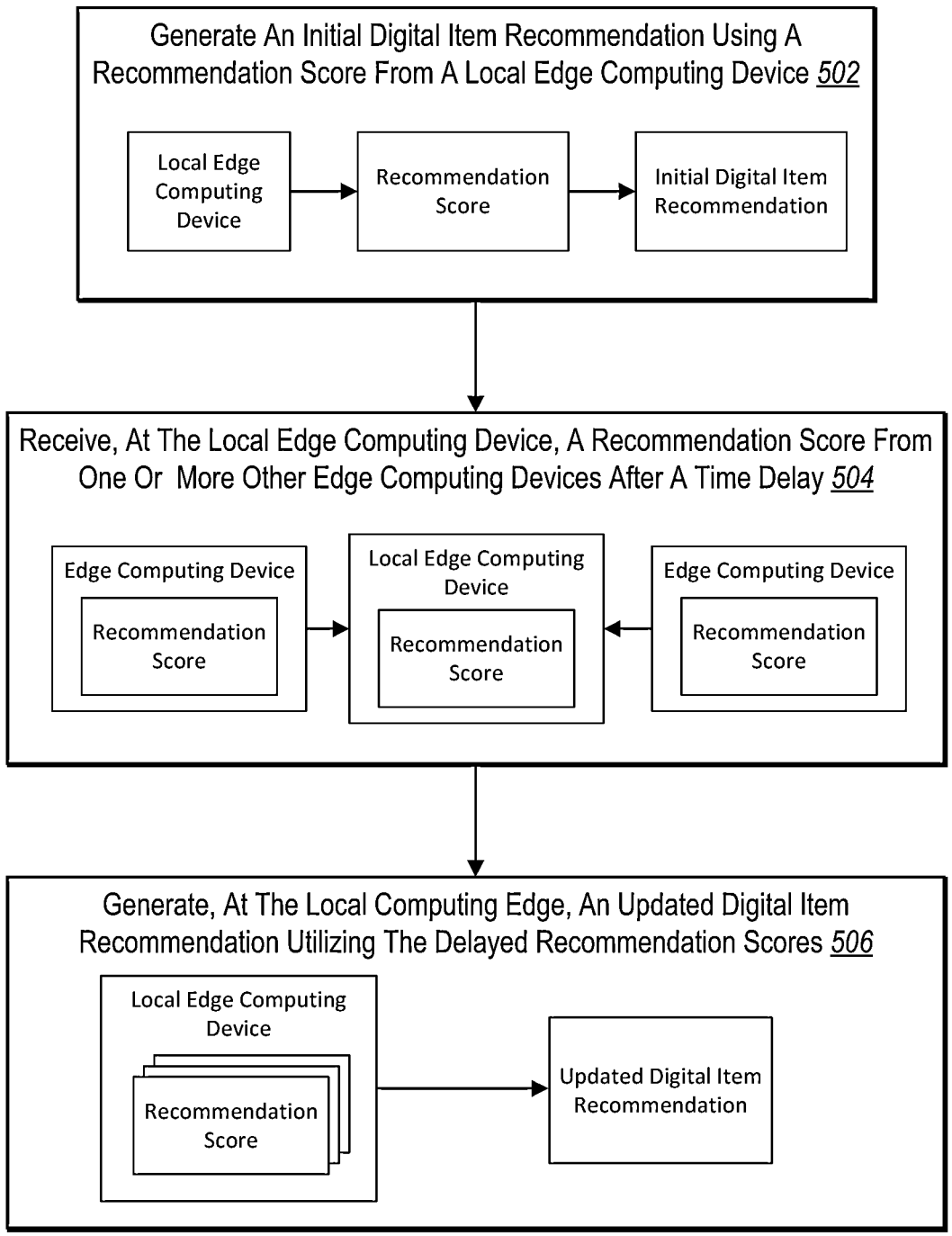
FIG. 5 illustrates a diagram for progressively refining a digital item recommendation in accordance with one or more embodiments.

As previously discussed, in some embodiments, the recommendation scores received by the edge-based recommender system 106 from the other edge computing devices are delayed (e.g., due to the geographic distance between edge computing devices). Accordingly, in some implementations, the edge-based recommender system 106 progressively refines a generated digital item recommendation as the other recommendation scores are received. FIG. 5 illustrates a diagram for progressively refining a digital item recommendation in accordance with one or more embodiments.

As shown in FIG. 5, the edge-based recommender system 106 performs an act 502 of generating an initial digital item recommendation using a recommendation score from a local edge computing device. Indeed, in some implementations, the edge-based recommender system 106 generates, at an edge computing device (e.g., the local edge computing device) an initial digital item recommendation before receiving recommendation scores from any other edge computing device of the distributed asynchronous coagent network. In particular, the edge-based recommender system 106 generates the initial digital item recommendation using the recommendation score generated at the local edge computing device utilizing a coagent recommendation model of the local edge computing device. In some cases, the edge-based recommender system 106 generates the initial digital item recommendation after receiving recommendation scores from some of the other edge computing devices, but before receiving recommendation scores. Further, in some embodiments, the edge-based recommender system 106 generates the initial digital item recommendation utilizing multiple recommendation scores generated at the local edge computing device via a plurality of coagent recommendation models of the local edge computing device.

Additionally, as shown in FIG. 5, the edge-based recommender system 106 performs an act 504 of receiving, at the local edge computing device, a recommendation score from one or more other edge computing devices after a time delay. In some embodiments, the edge-based recommender system 106 receives multiple recommendations scores from each of the other edge computing devices, where each recommendation score corresponds to a digital item associated with that edge computing device generated via a coagent recommendation model of that edge computing device.

Further, as shown in FIG. 5, the edge-based recommender system 106 performs an act 506 of generating, at the local edge computing device, an updated digital item recommendation utilizing the delayed recommendation scores. In particular, in some embodiments, the edge-based recommender system 106 generates the updated digital item recommendation utilizing the recommendation score(s) generated at the local edge computing device and the delayed recommendation score(s) received from the one or more other edge computing devices.

In one or more embodiments, the edge-based recommender system 106 provides the initial digital item recommendation to the client device and then provides the updated digital item recommendation generated after the recommendation scores are received from the other edge computing devices.

Thus, in one or more embodiments, the edge-based recommender system 106 provides quick, efficient digital item recommendations to client devices. Indeed, the edge-based recommender system 106 provides digital item recommendations to client devices without waiting for communications to be received from every edge computing device in the distributed asynchronous coagent network. Accordingly, the edge-based recommender system 106 leverages the efficiency of edge computing where an edge computing device that is geographically proximate to a client device can provide quick response times to the client device. Further, the edge-based recommender system 106 can provide digital item recommendations to client devices before computing resources have been consumed by the other edge computing devices of the distributed asynchronous coagent network.

Further, by progressively refining digital item recommendations in this manner, the edge-based recommender system 106 provides more flexibility when compared to conventional systems. For example, the edge-based recommender system 106 provides digital item recommendations to client devices when an edge computing device fails to respond with sufficient speed or even when an edge computing device fails to respond completely. Accordingly, the edge-based recommender system 106 can flexibly accommodate network issues that disrupt communications throughout the distributed asynchronous coagent network.

In some cases, however, the edge-based recommender system 106 intentionally waits to receive recommendation scores from one or more of the other edge computing devices before providing a digital item recommendation to a client device. For instance, in one or more embodiments, the edge-based recommender system 106 determines that input from a particular edge computing device or a particular set of edge computing devices is valuable enough to wait to receive the corresponding recommendation scores before providing a digital item recommendation. For example, in some cases, the edge-based recommender system 106 determines that the geographic location of a particular edge computing device provides enough additional value to the recommendation scores from that edge computing device or that the geographic position of the local edge computing device provides such relatively little value that waiting to receive the recommendations scores from the other edge computing device is beneficial.

As a non-limiting example, the edge-based recommender system 106 is able to determine that an edge computing device positioned in a particular geographic location typically associated with warm climate provides more valuable recommendations in response to a query for warm summer clothing when compared to a local edge computing device at a geographic location typically associated with cold climates. Thus, the edge-based recommender system 106 is able to determine to wait for recommendation scores from the edge computing device associated with the warm climate location before providing a digital item recommendation to the client device that submitted the query. In other words, the edge-based recommender system 106 that the recommendation scores of the local edge computing device alone would result in an undesirable digital item recommendation.

Figure 6A:
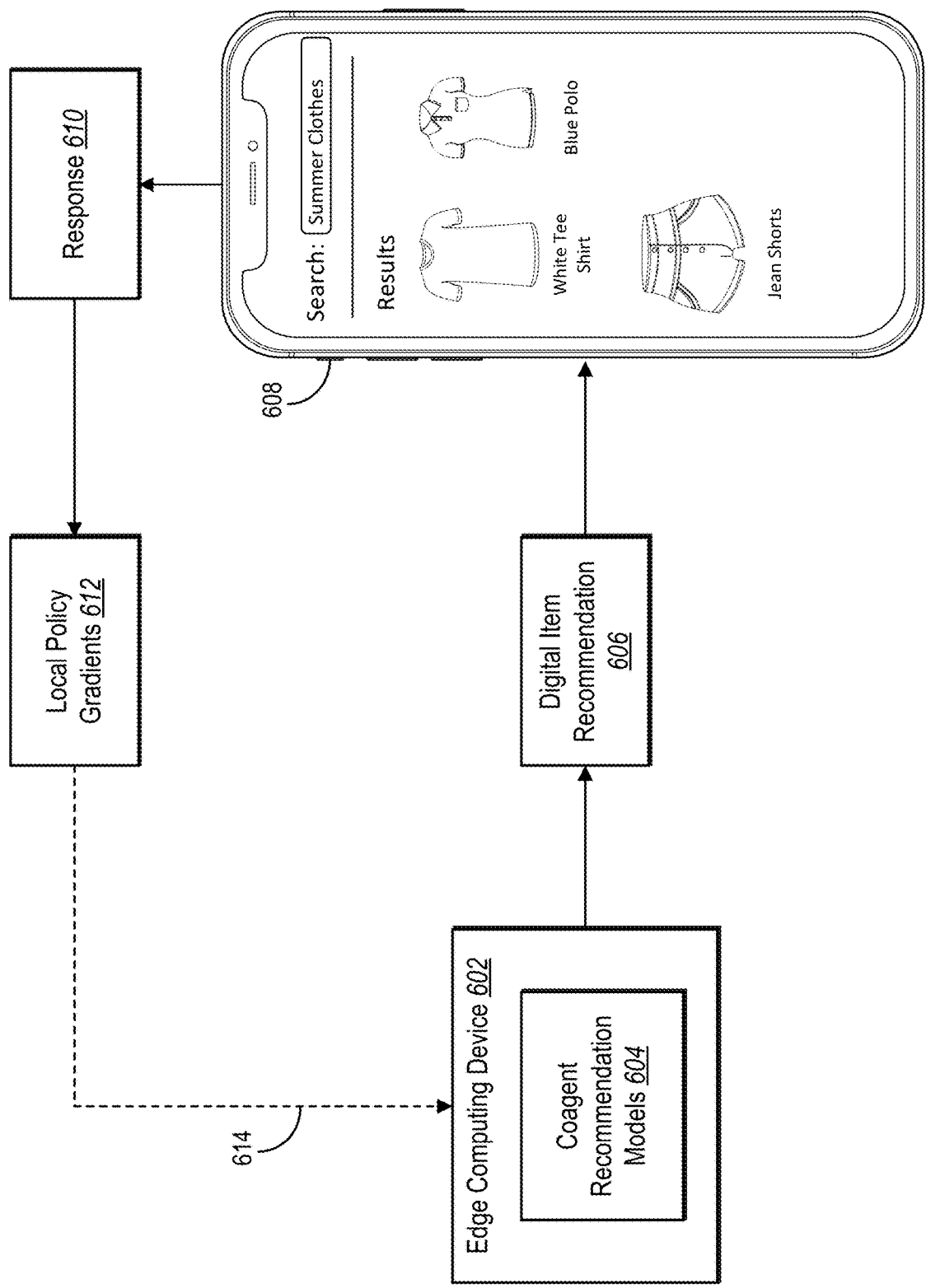
FIG. 6A illustrates a diagram for modifying the parameters of the coagent recommendation models of an edge computing device using local policy gradients in accordance with one or more embodiments.
Figure 6B:
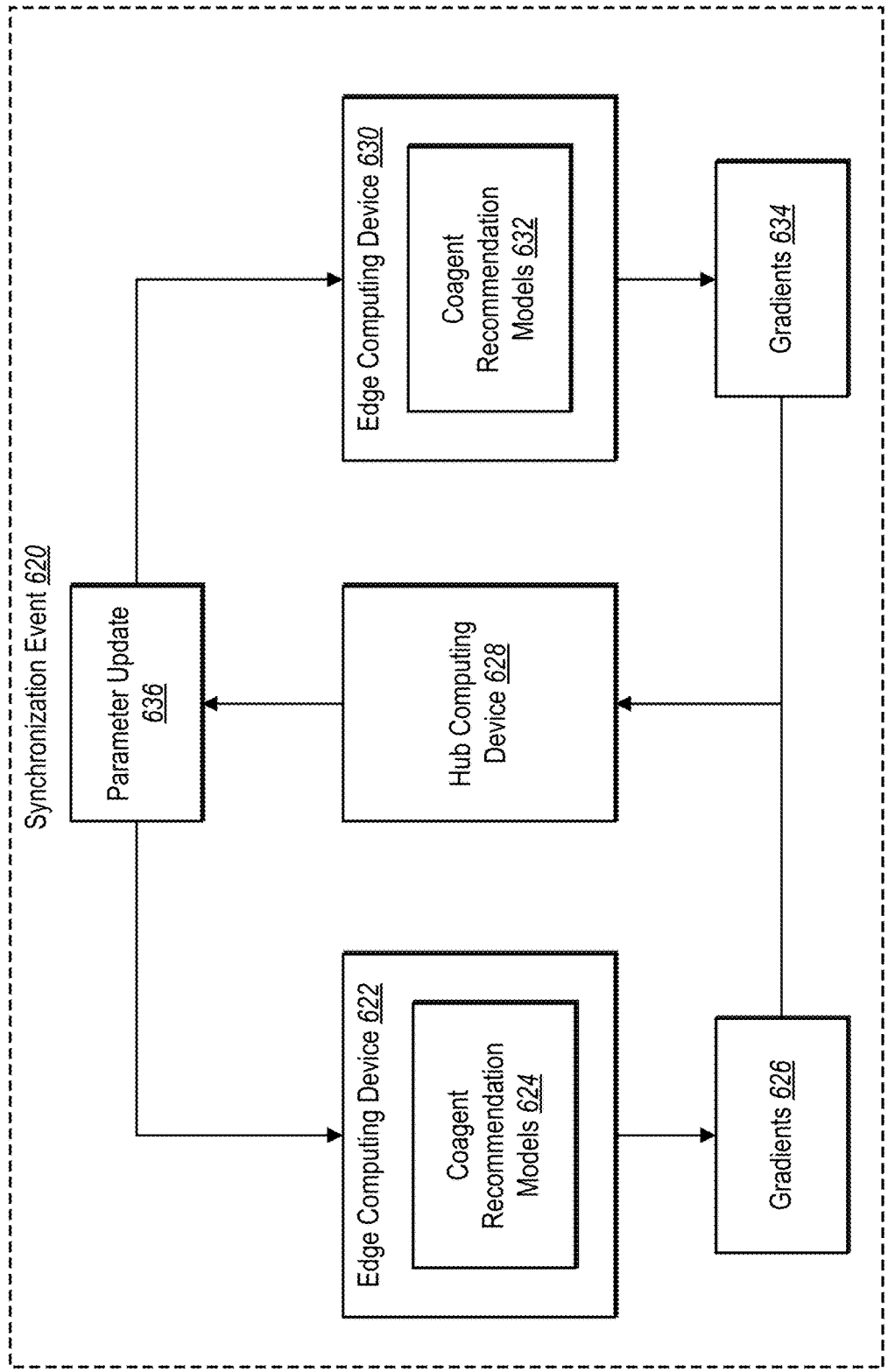
FIG. 6B illustrates a diagram for modifying parameters of the coagent recommendation models of multiple edge computing devices via a synchronization event in accordance with one or more embodiments.

As mentioned above, in one or more embodiments, the edge-based recommender system 106 modifies the parameters of the coagent recommendation models of the edge computing devices of the distributed asynchronous coagent network. FIGS. 6A-6B illustrate diagrams for modifying the parameters of coagent recommendation models in accordance with one or more embodiments. In particular, FIG. 6A illustrates a diagram for modifying the parameters of the coagent recommendation models of an edge computing device using local policy gradients in accordance with one or more embodiments. FIG. 6B illustrates a diagram for modifying parameters of the coagent recommendation models of multiple edge computing devices via a synchronization event in accordance with one or more embodiments.

Indeed, as shown in FIG. 6A, the edge-based recommender system 106 generates a digital item recommendation 606 at an edge computing device 602. In particular, the edge-based recommender system 106 generates the digital item recommendation 606 utilizing recommendation scores generated by the coagent recommendation models 604 of the edge computing device 602 (and recommendation scores generated by coagent recommendation models of other edge computing devices). Further, as shown, the edge-based recommender system 106 provides digital item recommendation 606 to the client device 608.

Additionally, as shown in FIG. 6A, the edge-based recommender system 106 determines a response 610 to the digital item recommendation 606. In one or more embodiments, the response 610 includes an action taken by the client device 608 in response to receiving the digital item recommendation 606. For example, in some cases, the response 610 includes viewing one or more digital items included in the digital item recommendation 606. In some embodiments, the response 610 involves clicking a link provided by the digital item recommendation 606 or sharing a link to the digital items included in the digital item recommendation 606 (e.g., via social media, text, email, etc.). In some implementations, the response 610 includes purchasing a digital item included in the digital item recommendation 606 or at least beginning the process of purchasing the digital item (e.g., adding the digital item to a cart for later purchasing).

As shown in FIG. 6A, the edge-based recommender system 106 determines local policy gradients 612 based on the response 610 to the digital item recommendation 606. Further, as shown, the edge-based recommender system 106 utilizes the local policy gradients 612 to modify the parameters of the coagent recommendation models 604 (as shown by the dashed line 614). For example, in at least one implementation, the edge-based recommender system 106 determines the local policy gradients 612 and updates the parameters of the coagent recommendation models 604 as follows:

$$\theta_i \leftarrow \theta_i \alpha \sum_{t \in \{t_1, t_2, \ldots, t_n\}} \gamma^t G_t \left( \frac{\partial \ln(X_t^i, U_t^i, \theta_i)}{\partial \theta_i} \right) \quad (1)$$

In equation 1, $\theta_i$ represents the parameters of coagent recommendation model i, $\alpha$ represents the step size, and $G_t$ represents the return (e.g., the future reward) up to time $t \in \mathbb{R}$. In one or more embodiments, time is continuous so the edge-based recommender system 106 utilizes t to represent values in the reals instead of just integers as is done in some conventional systems (e.g., those using reinforcement learning). Further, in equation 1, $X_t^i$ represents the inputs to the $i^{th}$ coagent recommendation model at time t (e.g., a subset of the observation space and/or a subset of the outputs of other coagent recommendation models), and $U_t^i$ represents the output (e.g., the digital item recommendation or recommendation score) of the $i^{th}$ coagent recommendation model at time t. Additionally, n represents the number of times the coagent recommendation model executes during a sequence of interactions with the environment so that $t_1, t_2, \ldots, t_n$ represent the times of the first execution, the second execution, and so forth to the nth execution. Thus, in one or more embodiments, the edge-based recommender system 106 utilizes equation 1 to update a coagent recommendation model after a sequence of interactions.

In some cases, the edge-based recommender system 106 implements a policy gradient algorithm other than the one provided by equation 1 to determine local policy gradients and update parameters. For instance, in some cases, the edge-based recommender system 106 utilizes an actor-critic algorithm, an off-policy policy gradient algorithm, a deterministic policy gradient algorithm, or a trust region policy optimization algorithm.

As indicated by equation 1, in one or more embodiments, the edge-based recommender system 106 updates the parameters of the coagent recommendation models 604 after a series of executions. For example, in some embodiments, the edge-based recommender system 106 updates the parameters of the coagent recommendation models 604 after a series of generating recommendation scores using the coagent recommendation models 604. In some cases, the edge-based recommender system 106 updates the parameters of the coagent recommendation models 604 after a series of generating digital item recommendations via the edge computing device 602. In some implementations, the edge-based recommender system 106 updates the parameters of the coagent recommendation models 604 after a series of generating digital item recommendations via any edge computing device of the distributed asynchronous coagent network. Indeed, in some cases, the edge-based recommender system 106 determines local policy gradients for the coagent recommendation models 604 from a response to a digital item recommendation even if the digital item recommendation was generated at another edge computing device.

In one or more embodiments, however, the edge-based recommender system 106 updates the parameters of the coagent recommendation models 604 after every execution (e.g., every instance of generating recommendation scores or generating a digital item recommendation at the edge computing device 602).

By modifying the parameters of coagent recommendation models using local policy gradients, the edge-based recommender system 106 provides improved flexibility when compared to many conventional systems. Indeed, by using local policy gradients to modify local coagent recommendation models, the edge-based recommender system 106 can improve the recommendations (or recommendation scores) generated at edge computing devices without having to synchronize with other edge computing devices of the distributed asynchronous coagent network. Thus, by updating the coagent recommendation models at each edge computing device using their corresponding local policy gradients, the edge-based recommender system 106 can improve the digital item recommendations generated by the distributed asynchronous coagent network as a whole. Indeed, in some implementations, the edge-based recommender system 106 updates coagent recommendation models in accordance with the coagent policy gradient theorem described by James E. Kostas et al., Asynchronous Coagent Networks, https://arxiv.org/pdf/1902.05650.pdf, 2020, which is incorporated herein by reference in its entirety.

Though not shown in FIG. 6A, the edge-based recommender system 106 similarly modifies parameters of the recommendation generator of each edge computing device. Indeed, in one or more embodiments, the recommendation generator (which can include a coagent recommendation model) includes one or more parameters for generating digital item recommendations based on recommendation scores. Accordingly, in some cases, the edge-based recommender system 106 determines local policy gradients for the recommendation generator of each edge computing device based on the digital item recommendations and modifies the parameters of the recommendation generator using its local policy gradients.

As mentioned, FIG. 6B illustrates a diagram for modifying parameters of the coagent recommendation models of multiple edge computing devices via a synchronization event in accordance with one or more embodiments. As shown in FIG. 6B, during a synchronization event 620, the edge-based recommender system 106 determines gradients 626 for coagent recommendation models 624 of an edge computing device 622 as well as gradients 634 for coagent recommendation models 632 of an edge computing device 630 of a distributed asynchronous coagent network. In one or more embodiments, the gradients 626 include gradients determined for the coagent recommendation models 624 from a previous (e.g., the most recent) synchronization event. Likewise, in some cases, the gradients 634 include gradients determined for the coagent recommendation models 632 from a previous synchronization event. In other words, in some cases, the gradients 626, 634 include gradients determined in between synchronization events.

As further shown in FIG. 6B, during the synchronization event 620, the edge-based recommender system 106 provides the gradients 626, 634 to a hub computing device 628 of the distributed asynchronous coagent network. Further, the edge-based recommender system 106 generates, at the hub computing device 628, a parameter update 636. In one or more embodiments, the edge-based recommender system 106 generates the parameter update 636 by combining the gradients 626, 634. For example, in some cases, the edge-based recommender system 106 sums the gradients 626, 634 to generate the parameter update 636. In some instances, the edge-based recommender system 106 determines an average of the gradients 626, 634 for the parameter update 636. In one or more embodiments, the edge-based recommender system 106 applies weights to the gradients 626, 634 for generating the parameter update 636.

As illustrated in FIG. 6B, the edge-based recommender system 106 provides the parameter update 636 from the hub computing device 628 back to the edge computing devices 622, 630. The edge-based recommender system 106 further utilizes the parameter update 636 to modify the coagent recommendation models 624, 632 of the edge computing devices 622, 630, respectively. Indeed, in some cases, the coagent recommendation models 624, 632 include the same number of parameters and so use a common parameter update to modify those parameters. Thus, in one or more embodiments, the edge-based recommender system 106 utilizes the parameter update 636 to synchronize the parameters of the coagent recommendation models 624, 632 during the synchronization event 620.

Though FIG. 6B only illustrates synchronization between two edge computing devices, it should be noted that the edge-based recommender system 106 similarly synchronizes various numbers (e.g., all) of the edge computing devices of a distributed asynchronous coagent network. Further, FIG. 6B illustrates updating the coagent recommendation models used to generate recommendation scores via synchronization but not updating the recommendation generator component of each edge computing devices. Indeed, in some cases, the recommendation generator of each edge computing device does not synchronize parameters with the other edge computing devices. In some cases, however, the edge-based recommender system 106 does synchronize the parameters of the recommendation generator (which can include another coagent recommendation model) as described above.

In one or more embodiments, the edge-based recommender system 106 utilizes synchronization events to periodically synchronize the parameters of the coagent recommendation models distributed across the distributed asynchronous coagent network (e.g., after ever n number of digital item recommendations, once a day, etc.). In some cases, the edge-based recommender system 106 further modifies the parameters of the coagent recommendation models in between synchronization events. For instance, in some cases, the edge-based recommender system 106 modifies the parameters of each coagent recommendation model using corresponding local policy gradients as discussed above with reference to FIG. 6A in between synchronization events. Thus, in some cases, the edge-based recommender system 106 facilitates asynchronous operation across the distributed asynchronous coagent network while allowing for periodic synchronization.

In some embodiments, however, the edge-based recommender system 106 updates the parameters of coagent recommendations models of an edge computing device based on the response to a digital item recommendation generated at another edge computing device without using synchronization events. To provide an example, in at least one implementation, the edge-based recommender system 106 provides a digital item recommendation to a client device and determines a response to (e.g., reward from) the digital item recommendation. The edge-based recommender system 106 transmits an indication of the response (e.g., the reward) to the other edge computing devices (e.g., their coagent recommendation models). In some cases, the edge-based recommender system 106 provides a timestamp along with the indication of the response. The edge-based recommender system 106 further updates, at each edge computing device, the local coagent recommendation models using the response and the timestamp. For instance, the edge-based recommender system 106 can update the parameters of the local coagent recommendation models at the end of each episode (e.g., at the end of every hour, the end of every night, etc.) in which the response was received (or the digital item recommendation provide) along with any other responses associated with that episode.

Accordingly, in some embodiments, the edge-based recommender system 106 utilizes the responses received at an edge computing device to determine the gradients for coagent recommendation models of other edge computing devices. Further, the edge-based recommender system 106 operates asynchronously while mitigating the introduction of local biases into the local coagent recommendation models. Indeed, in some implementations, the edge-based recommender system 106 determines gradients for the local coagent recommendation models equivalent to what would be determined for the distributed asynchronous coagent network as a whole if operating synchronously.

By including a timestamp with the indication of response, the edge-based recommender system 106 can operate to update the coagent recommendation models despite delays in transmitting/receiving the response indications. Indeed, as long as a response indication is received at an edge computing device eventually, the edge-based recommender system 106 can utilize the indication of the response to determine gradients for the local coagent recommendation models of the edge computing device.

In some cases, the edge-based recommender system 106 determines not to use indications of rewards associated with the end of an episode (e.g., the last ten minutes of an hour-long episode). For instance, in some cases, the edge-based recommender system 106 determines that such reward indications may not be received by all edge computing devices before the end of an episode, causing an imbalance when updating parameters across the distributed asynchronous coagent network. Accordingly, the edge-based recommender system 106 can discard or otherwise exclude these reward indications when updating parameters. In some implementations, however, the edge-based recommender system 106 determines to utilize those reward indications for the parameter update of the next episode, allowing more time for the edge computing devices to receive the reward indications.

As mentioned above, in one or more embodiments, the edge-based recommender system 106 accurately generates digital item recommendations that are relevant to client devices. In particular, the edge-based recommender system 106 accurately learns and operates within an edge computing environment (e.g., a distributed asynchronous coagent network). Researchers have conducted studies to determine the accuracy of various embodiments of the edge-based recommender system 106. FIGS. 7A-7E illustrate graphs reflecting experimental results regarding the effectiveness of the edge-based recommender system 106 in accordance with one or more embodiments.

The developed the models used in the experiments using data from the Adobe Stock Image Data. The data used included a subset of 1,772 images and 407 unique queries. The researchers compared the performance of the edge-based recommender system 106 with performance of a random policy (labeled "Random" in the graphs). The graphs of FIGS. 7A-7E reflect the performance of the tested models as the return obtained in generating recommendations. The graphs also reflect the standard deviation observed between trials via the error bars.

Figure 7A:
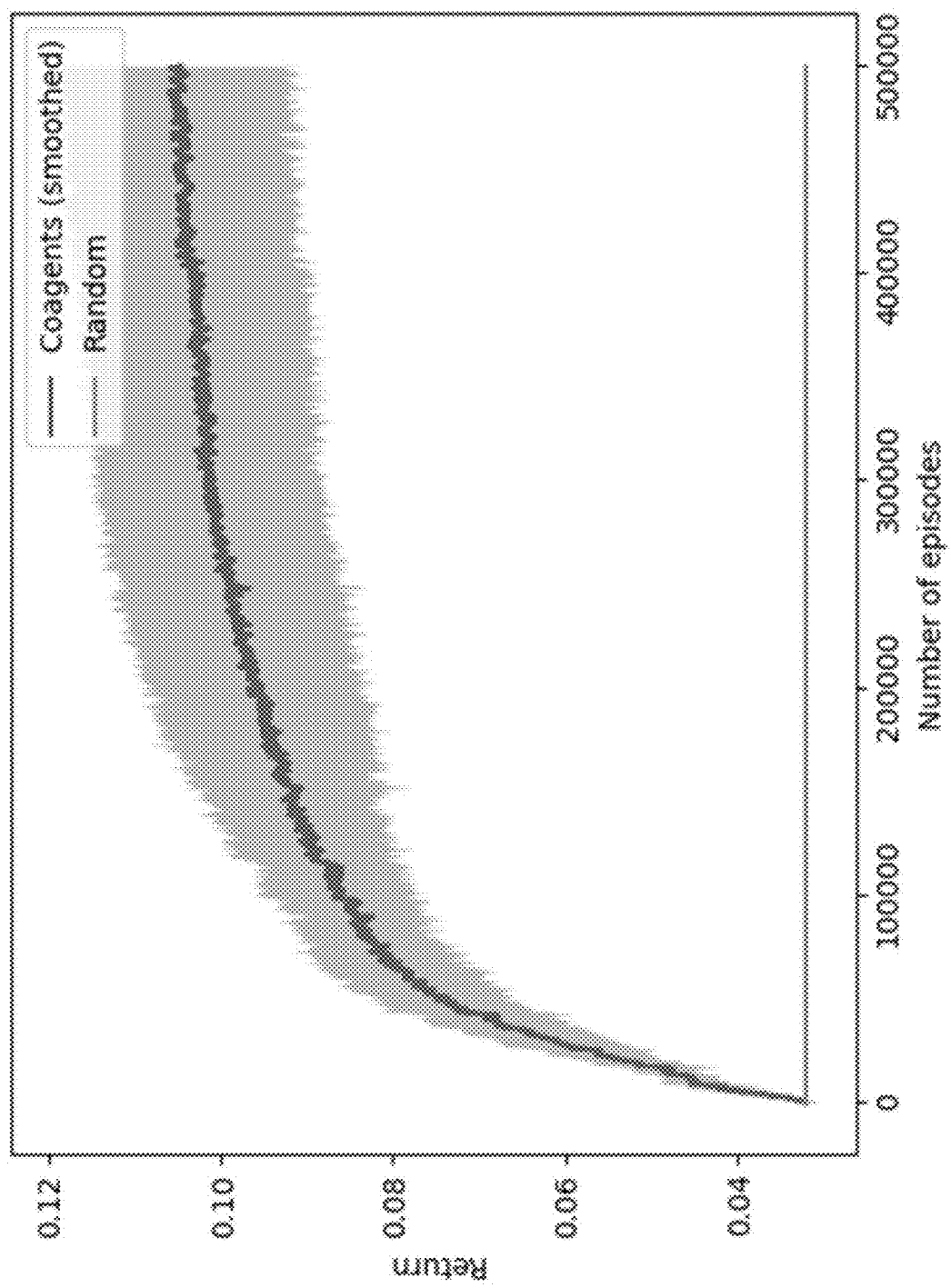
FIGS. 7A-7E illustrate graphs reflecting experimental results regarding the effectiveness of the edge-based recommender system in accordance with one or more embodiments.
Figure 7B:
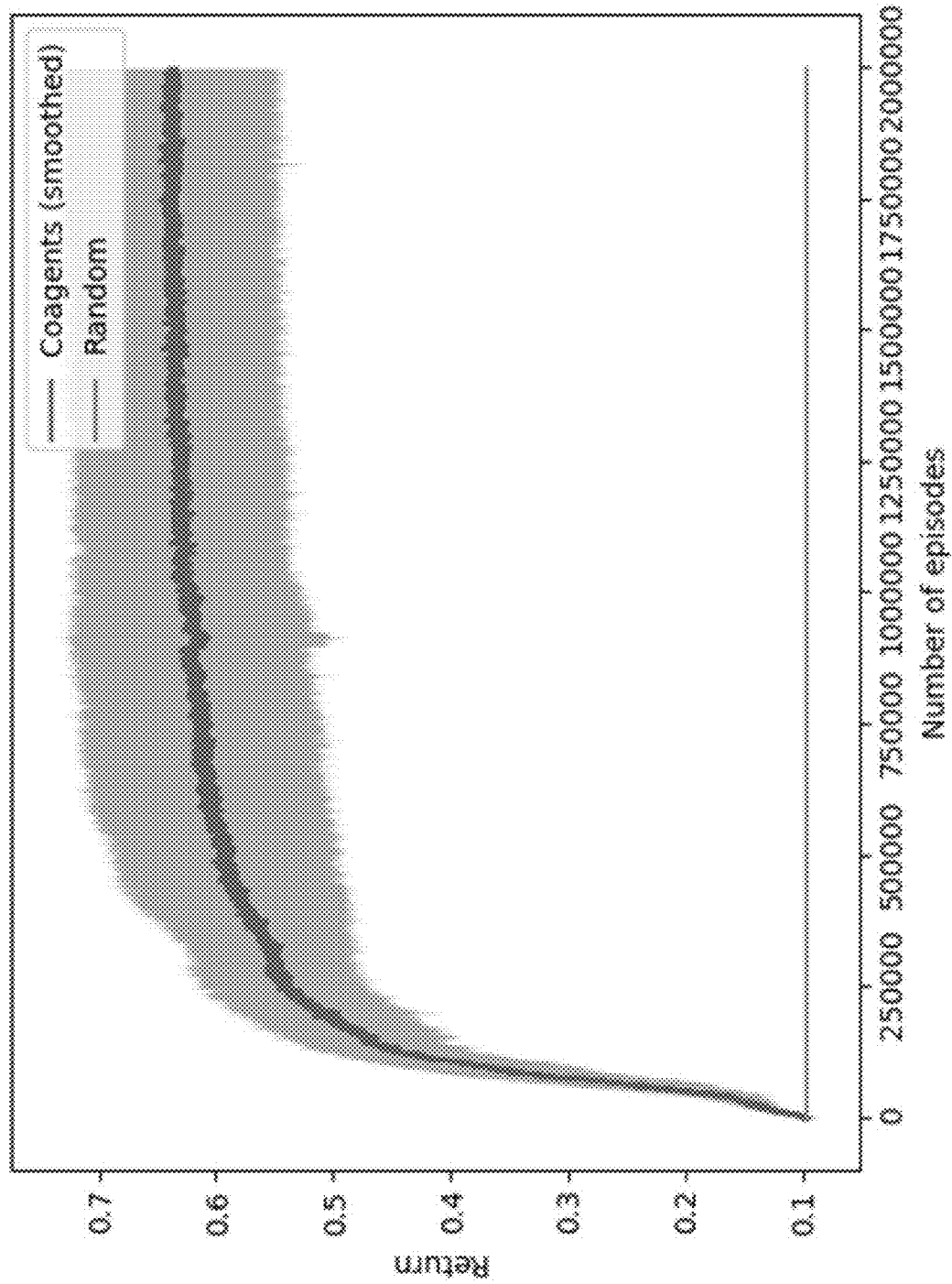

The graphs of FIG. 7A-7B illustrate the performance of the tested models in synchronized bandit simulations where there is no temporal aspect to be considered. While a large number of episodes are shown in each of the graphs, it can be seen that the edge-based recommender system 106 learns an effective recommendation strategy quickly (especially compared to the random policy). Further, the graphs show that the edge-based recommender system 106 steadily continues to improve over time.

Figure 7C:
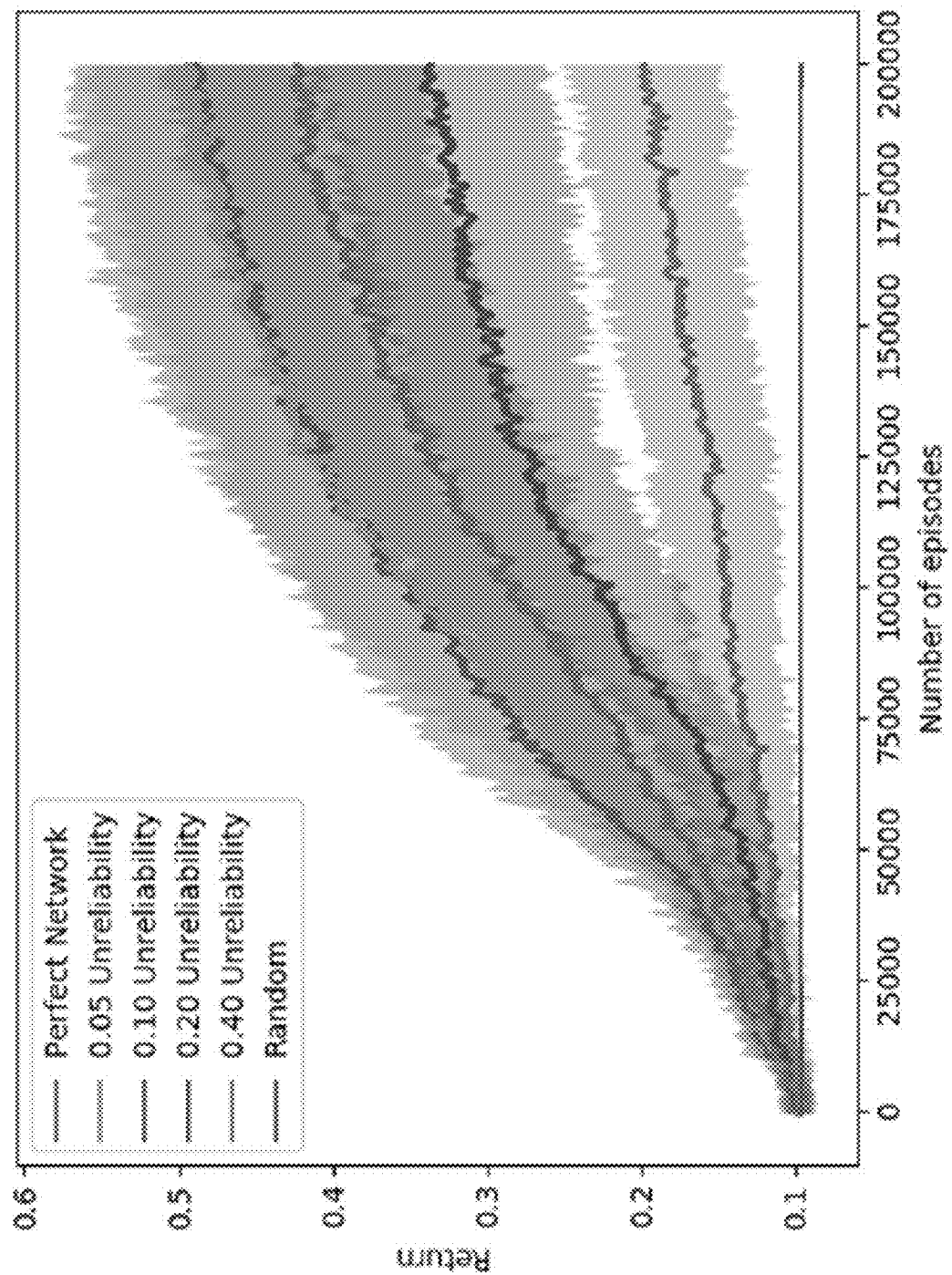

The graph of FIG. 7C illustrates the performance in an asynchronous edge setting. In particular, the graph shows the performance of various embodiments of the edge-based recommender system 106 where the corresponding distributed network is asynchronous to different degrees. Indeed, the graph provides an "unreliability parameter" that indicates how synchronous the corresponding distributed network is. A value of 0.0 indicates that the distributed network is fully synchronous and a value of 1.0 indicates that the distributed network is fully asynchronous (suggesting that communication between edge computing devices is extremely unlikely to happen). More specifically, an unreliability of $p \in [0,1]$ means that, with probability p, each digital item/query pair will not compute a scalar in time to responds to the local edge computing device before it must display results to the client device (so the digital item is unavailable at that time step).

As shown by the graph of FIG. 7C, the edge-based recommender system 106 continues to learn effective recommendation strategies in an increasingly asynchronous edge computing setting. As the unreliability increases, the environment becomes more challenging, making communication more difficult between edge computing devices. The edge-based recommender system 106, however, is still able to implement relatively effective recommendation policies.

Figure 7D:
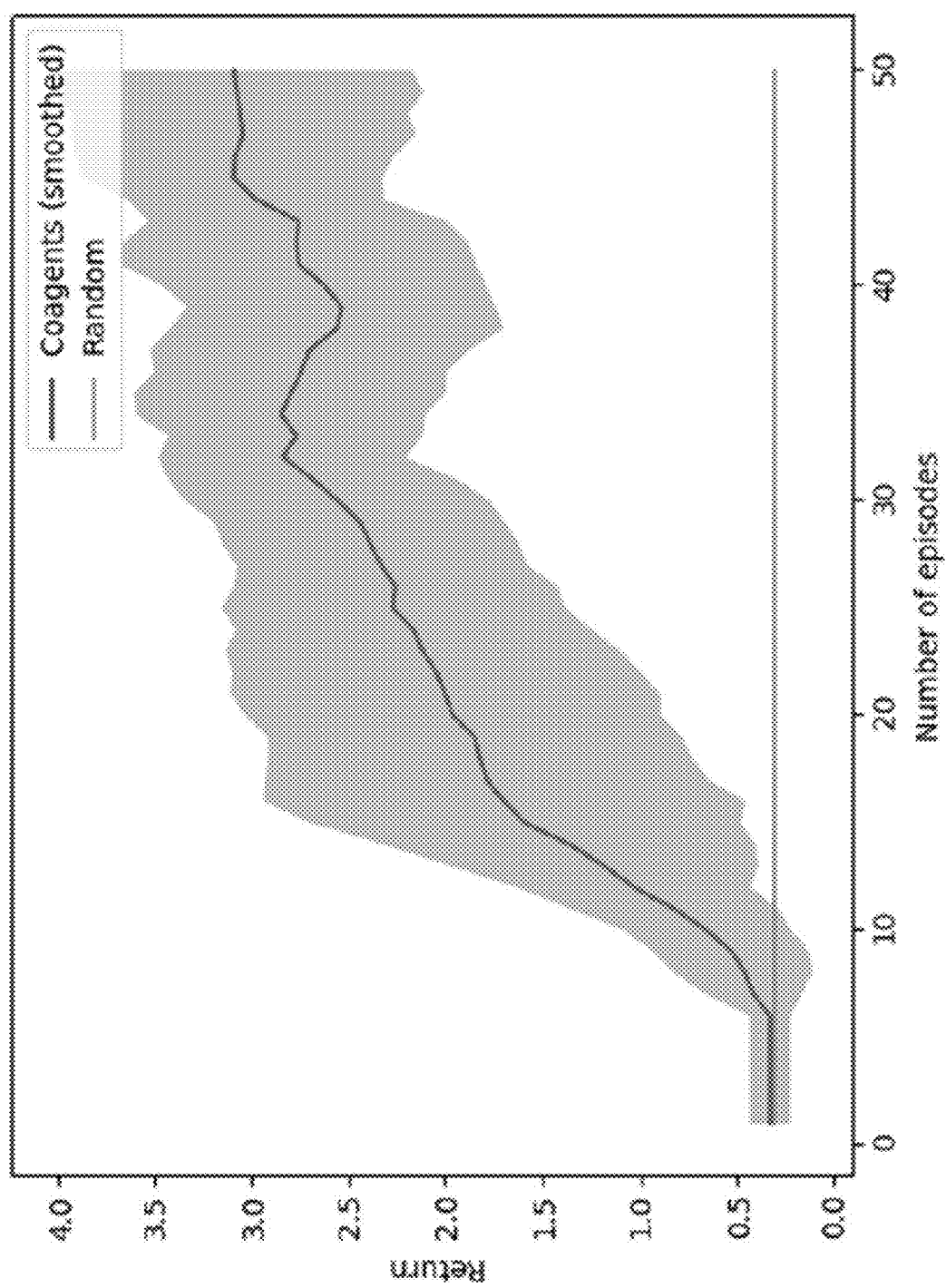

The graph of FIG. 7D reflects the performance of the tested models operating within a scenario having a temporal aspect based on the scenario described by Eugene Ie et al., *Slateq: A Tractable Decomposition for Reinforcement Learning with Recommendation Sets*, Proceedings of the Twenty-eight International Joint Conference on Artificial Intelligence, pp. 2592-99 (2019). In this setting, the researchers added a non-observable dimension to the state space, which represents some aspect of the user's internal state. The value of the non-observable dimension begins each episode with a value of zero and increases by a random variable when a relevant digital item is recommended. When the non-observable dimension reaches a value of 1.0 or more, the reward given for each timestep increases by 1.0 for the duration of the episode. The scenario represents the idea that a model that aims to increase the value of the non-observable state as well as make good recommendations will perform more effectively. As shown by the graph of FIG. 7D, the edge-based recommender system 106 learns and operates effectively in this setting.

Figure 7E:
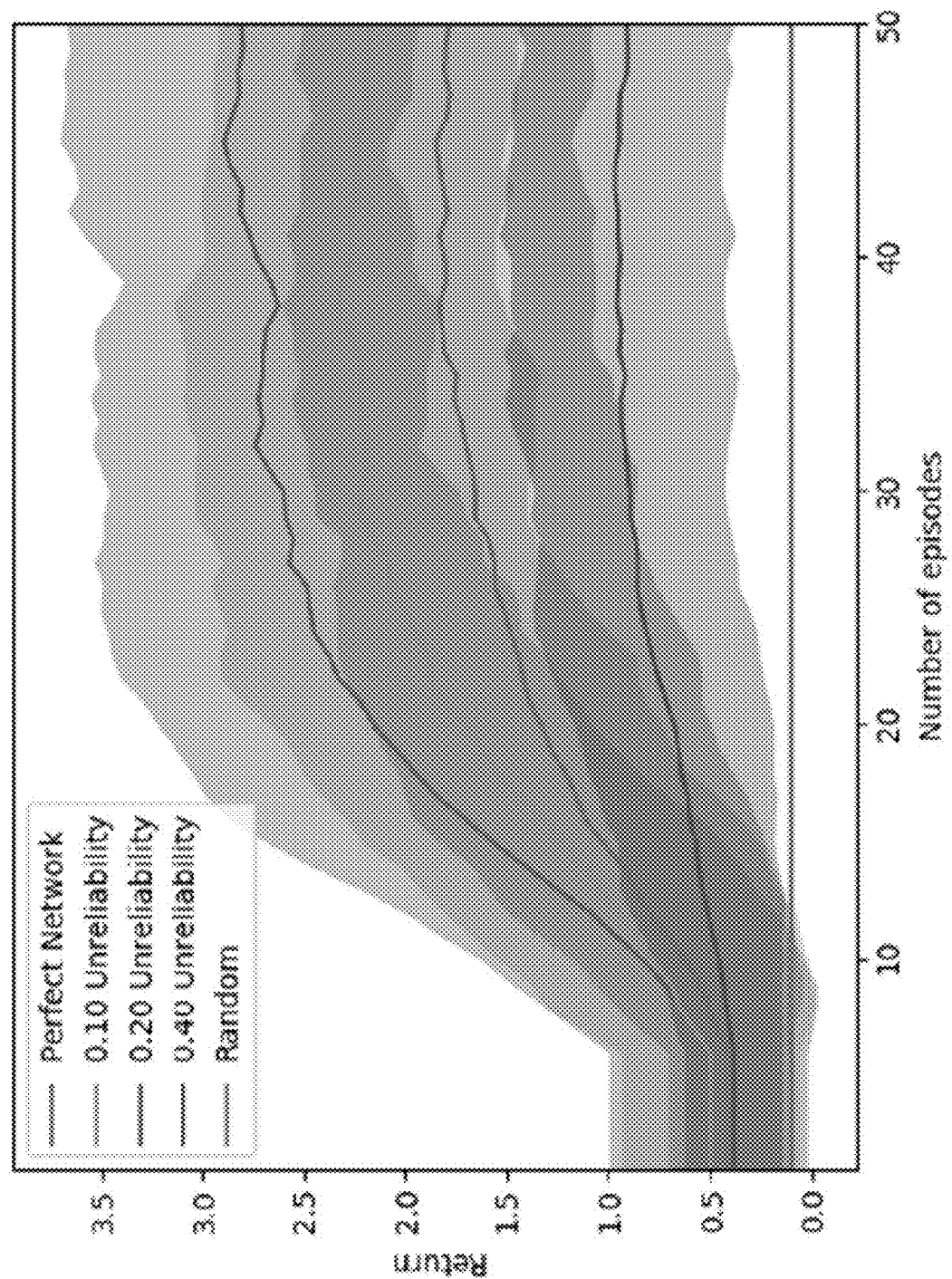

The graph of FIG. 7E reflects the performance of the tested models in a setting that combines the setting represented in FIG. 7D with the asynchronous edge setting represented in FIG. 7C. As discussed above, the increasing unreliability value represents an increasingly harsh environment. As shown by the graph of FIG. 7E, however, the edge-based recommender system 106 operates effectively in this setting.

Figure 8:
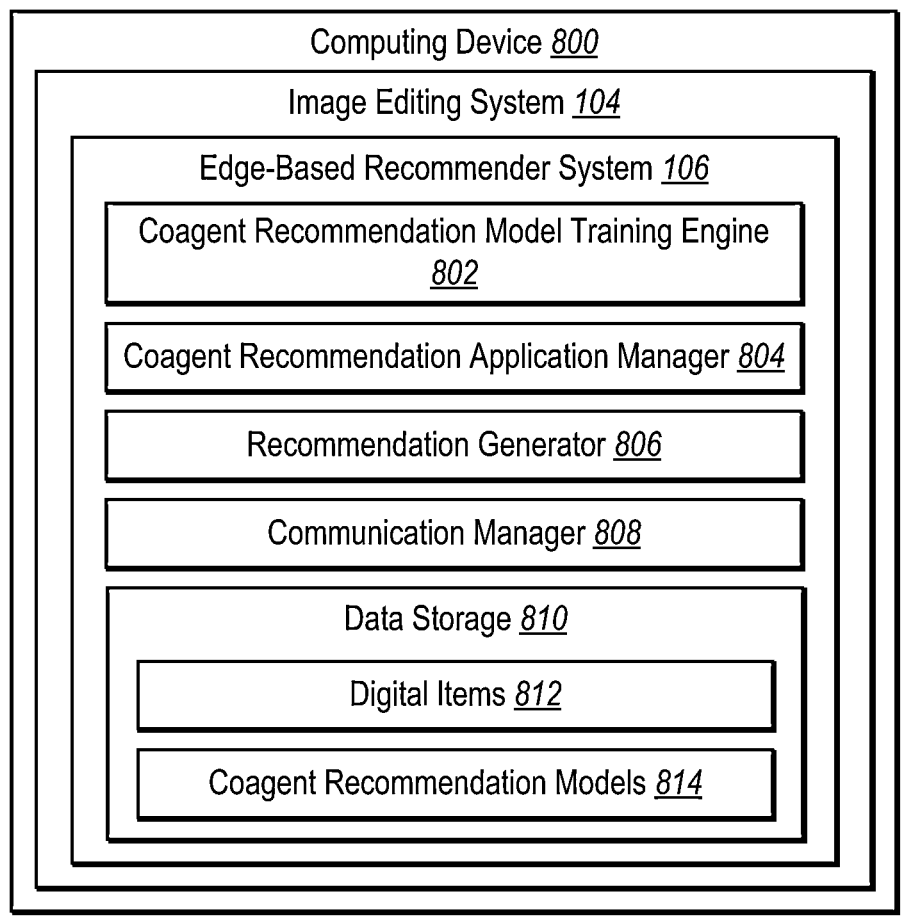
FIG. 8 illustrates an example schematic diagram of an edge-based recommender system in accordance with one or more embodiments.

Turning to FIG. 8, additional detail will now be provided regarding various components and capabilities of the edge-based recommender system 106. In particular, FIG. 8 shows the edge-based recommender system 106 implemented by the computing device 800 (e.g., at least one of the edge computing devices 102a-102n, the hub computing device 116, and/or one of the client devices 110a-110n discussed above with reference to FIG. 1). Additionally, the edge-based recommender system 106 is also part of the item distribution system 104. As shown, in one or more embodiments, the edge-based recommender system 106 includes, but is not limited to, a coagent recommendation model training engine 802, a coagent recommendation model application manager 804, a recommendation generator 806, a communication manger 808, and data storage 810 (which includes digital items 812 and coagent recommendation models 814).

As just mentioned, and as illustrated in FIG. 8, the edge-based recommender system 106 includes the coagent recommendation model training engine 802. In one or more embodiments, the coagent recommendation model training engine 802 trains the (local) coagent recommendation models of the computing device 800. In particular, in some embodiments, the coagent recommendation model training engine 802 modifies the parameters of the coagent recommendation models. For instance, in some cases, the coagent recommendation model training engine 802 modifies the parameters of the coagent recommendation models using local policy gradients determined from responses to digital item recommendations. In some implementations, the coagent recommendation model training engine 802 modifies the parameters of the coagent recommendation models during a synchronization event based on a combination of the local policy gradients determined at the computing device 800 and gradients determined at other computing devices (e.g., other edge computing devices) of a distributed asynchronous coagent network.

As further shown in FIG. 8, the edge-based recommender system 106 includes the coagent recommendation model application manager 804. In one or more embodiments, the coagent recommendation model application manager 804 executes the coagent recommendation models of the computing device 800 to generate recommendation scores for corresponding digital items. In some cases, the coagent recommendation model application manager 804 utilizes the coagent recommendation models to generate the recommendation scores based on item features of the corresponding digital items and/or user attributes of the client device for which the digital item recommendation is to be generated.

Additionally, as shown in FIG. 8, the edge-based recommender system 106 includes the recommendation generator 806. In one or more embodiments, the recommendation generator 806 generates a digital item recommendation using the recommendation scores generated by the coagent recommendation model application manager 804. In some cases, the recommendation generator 806 further generates the digital item recommendation using recommendation scores received from other computing devices (e.g., other edge computing devices) of the distributed asynchronous coagent network.

As shown in FIG. 8, the edge-based recommender system 106 also includes the communication manger 808. In one or more embodiments, the communication manger 808 facilitates communication between the edge-based recommender system 106 (e.g., the computing device 800) and other computing devices. For instance, in some cases, the communication manger 808 receives recommendation scores generated at other computing devices (e.g., other edge computing devices) of the distributed asynchronous coagent network. In some implementations, the communication manger 808 provides recommendation scores generated via the coagent recommendation model application manager 804 to one or more of the other computing devices for generation of a digital item recommendation. In some embodiments, the 808 provides local gradients determined for the coagent recommendation models of the computing device 800 and/or receives parameter updates for modifying the parameters of the coagent recommendation models. Further, in some implementations, the 808 provides digital item recommendations to client devices.

Further, as shown in FIG. 8, the edge-based recommender system 106 includes data storage 810. In particular, data storage 810 includes digital items 812 and coagent recommendation models 814. In one or more embodiments, digital items 812 store the digital items associated with each coagent recommendation model of the computing device 800. In some embodiments, coagent recommendation models 814 store the coagent recommendation models of the computing device 800 (e.g., the local coagent recommendation models) that are updated via the coagent recommendation model training engine 802 and implemented via the coagent recommendation model application manager 804.

Each of the components 802-814 of the edge-based recommender system 106 can include software, hardware, or both. For example, the components 802-814 can include one or more instructions stored on a computer-readable storage medium and executable by processors of one or more computing devices, such as a client device or server device. When executed by the one or more processors, the computer-executable instructions of the edge-based recommender system 106 can cause the computing device(s) to perform the methods described herein. Alternatively, the components 802-814 can include hardware, such as a special-purpose processing device to perform a certain function or group of functions. Alternatively, the components 802-814 of the edge-based recommender system 106 can include a combination of computer-executable instructions and hardware.

Furthermore, the components 802-814 of the edge-based recommender system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-814 of the edge-based recommender system 106 may be implemented as a stand-alone application, such as a desktop or mobile application. Furthermore, the components 802-814 of the edge-based recommender system 106 may be implemented as one or more web-based applications hosted on a remote server. Alternatively, or additionally, the components 802-814 of the edge-based recommender system 106 may be implemented in a suite of mobile device applications or "apps." For example, in one or more embodiments, the edge-based recommender system 106 can comprise or operate in connection with digital software applications such as ADOBE® EXPERIENCE CLOUD®, ADOBE® STOCK, or ADOBE® TARGET. "ADOBE" and "EXPERIENCE CLOUD" are either registered trademarks or trademarks of Adobe Inc. in the United States and/or other countries.

Figure 9:
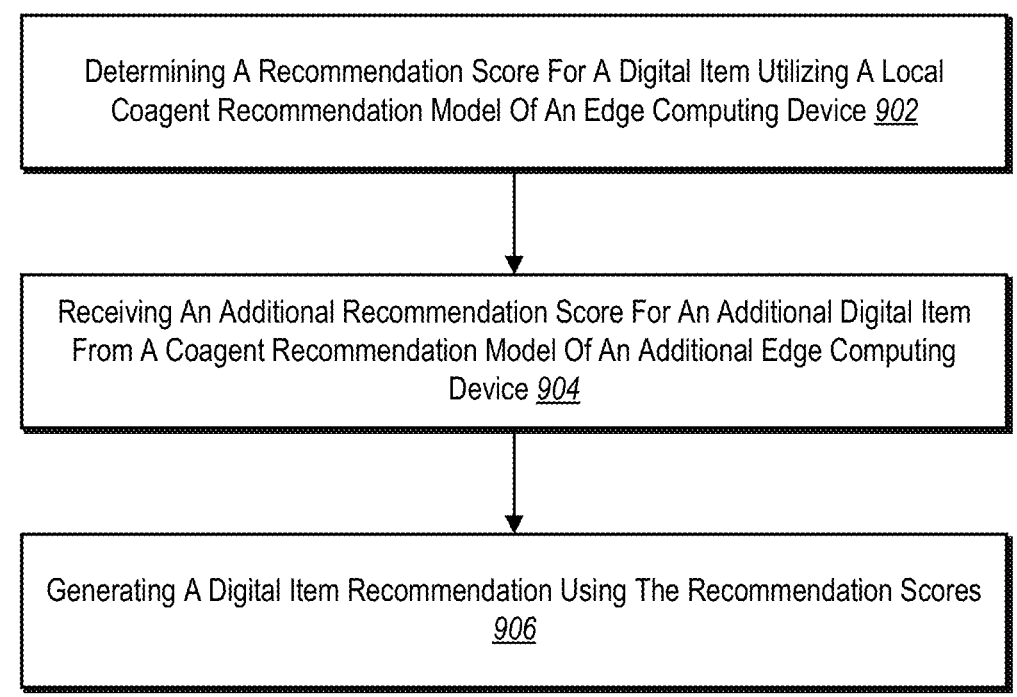
FIG. 9 illustrates a flowchart of a series of acts for generating a digital item recommendation using edge computing devices of a distributed asynchronous coagent network in accordance with one or more embodiments.

FIGS. 1-8, the corresponding text, and the examples provide a number of different methods, systems, devices, and non-transitory computer-readable media of the edge-based recommender system 106. In addition to the foregoing, one or more embodiments can also be described in terms of flowcharts comprising acts for accomplishing the particular result, as shown in FIG. 9. FIG. 9 may be performed with more or fewer acts. Further, the acts may be performed in different orders. Additionally, the acts described herein may be repeated or performed in parallel with one another or in parallel with different instances of the same or similar acts.

FIG. 9 illustrates a flowchart of a series of acts 900 for generating a digital item recommendation using edge computing devices of a distributed asynchronous coagent network in accordance with one or more embodiments. While FIG. 9 illustrates acts according to one embodiment, alternative embodiments may omit, add to, reorder, and/or modify any of the acts shown in FIG. 9. In some implementations, the acts of FIG. 9 are performed as part of a method. For example, in some embodiments, the acts of FIG. 9 are performed, in a digital medium environment for edge computing, as part of a computer-implemented method for generating local digital item recommendations using various edges. Alternatively, a non-transitory computer-readable medium can store instructions thereon that, when executed by at least one processor, cause a computing device to perform the acts of FIG. 9. In some embodiments, a system performs the acts of FIG. 9. For example, in one or more embodiments, a system includes at least one memory device comprising a local coagent recommendation model of a distributed asynchronous coagent network and a digital item. The system further includes at least one server device configured to cause the system to perform the acts of FIG. 9.

The series of acts 900 includes an act 902 of determining a recommendation score for a digital item utilizing a local coagent recommendation model of an edge computing device. For instance, in one or more embodiments, the act 902 involves determining, at an edge computing device of a distributed asynchronous coagent network, a recommendation score for a digital item utilizing a local coagent recommendation model corresponding to the edge computing device and based on one or more item features of the digital item. In one or more embodiments, determining the recommendation score for the digital item utilizing the local coagent recommendation model corresponding to the edge computing device comprises determining the recommendation score for the digital item utilizing a reinforcement learning model corresponding to the edge computing device.

In one or more embodiments, the edge-based recommender system 106 receives, at the edge computing device and from a client device, a query for one or more digital items. Accordingly, in some embodiments, determining the recommendation score utilizing the local coagent recommendation model corresponding to the edge computing device and receiving the additional recommendation score from the coagent recommendation model corresponding to the additional edge computing device are in response to receiving the query.

The series of acts 900 also includes an act 904 of receiving an additional recommendation score for an additional digital item from a coagent recommendation model of an additional edge computing device. For example, in one or more embodiments, the act 904 involves receiving, at the edge computing device and from a coagent recommendation model corresponding to an additional edge computing device of the distributed asynchronous coagent network, an additional recommendation score for an additional digital item associated with the additional edge computing device. In one or more embodiments, receiving, from the coagent recommendation model corresponding to the additional edge computing device, the additional recommendation score for the additional digital item comprises receiving the additional recommendation score from an additional reinforcement learning model corresponding to the additional edge computing device.

In one or more embodiments, the edge-based recommender system 106 determines, at the edge computing device, one or more user attributes associated with a client device corresponding to the digital item recommendation. Further, the edge-based recommender system 106 provides the one or more user attributes to the additional edge computing device for generation of the additional recommendation score. In some cases, the edge-based recommender system 106 further utilizes the one or more user attributes for generating the recommendation score at the edge computing device utilizing the local coagent recommendation system.

Further, the series of acts 900 includes an act 906 of generating a digital item recommendation using the recommendation scores. To illustrate, in one or more embodiments, the act 906 involves generating, at the edge computing device, a digital item recommendation utilizing the recommendation score and the additional recommendation score.

In one or more embodiments, generating, at the edge computing device, the digital item recommendation utilizing the recommendation score and the additional recommendation score comprises: determining an initial digital item recommendation utilizing the recommendation score; providing the initial digital item recommendation to a client device; receiving the additional recommendation score after providing the initial digital item recommendation to the client device; and generating the digital item recommendation by modifying the initial digital item recommendation utilizing the additional recommendation score.

In some cases, the edge-based recommender system 106 applies a weight to one or more of the recommendation score or the additional recommendation score for generating the digital item recommendation. As an example, in at least one implementation, the edge-based recommender system 106 determines a context for the digital item recommendation; and determines a weight for at least one of the recommendation score from the local coagent recommendation model or the additional recommendation score from the coagent recommendation model corresponding to the additional edge computing device utilizing the context for the digital item recommendation.

In one or more embodiments, the series of acts 900 further includes acts for synchronizing the local coagent recommendation model of the edge computing device with the coagent recommendation model of the additional edge computing device. For instance, in one or more embodiments, the acts involve synchronizing parameters of the local coagent recommendation model corresponding to the edge computing device with parameters of the coagent recommendation model corresponding to the additional edge computing device at a plurality of synchronization events. In some cases, synchronizing the parameters of the local coagent recommendation model with the parameters of the coagent recommendation model comprises modifying the parameters of the local coagent recommendation model utilizing a combination of one or more gradients associated with the local coagent recommendation model and one or more additional gradients associated with the coagent recommendation model. In one or more embodiments, the edge-based recommender system 106 further modifies the parameters of the local coagent recommendation model based on responses to digital item recommendations utilizing one or more local policy gradients in between the plurality of synchronization events.

To provide an illustration, in one or more embodiments, the edge-based recommender system 106 determines, utilizing a local coagent recommendation model of a distributed asynchronous coagent network, a recommendation score for a digital item based on one or more item features of the digital item; generates a digital item recommendation utilizing the recommendation score; provides the digital item recommendation for display within a graphical user interface of a client device; receives an additional recommendation score for an additional digital item generated by an additional coagent recommendation model of the distributed asynchronous coagent network, the additional coagent recommendation model associated with a different edge computing device of the distributed asynchronous coagent network than the local coagent recommendation model; and generates, for display within the graphical user interface of the client device, an updated digital item recommendation utilizing the recommendation score and the additional recommendation score.

In some embodiments, the edge-based recommender system 106 generates the digital item recommendation utilizing the recommendation score by generating the digital item recommendation to recommend the digital item stored with the local coagent recommendation model based on the recommendation score. Further, in some cases, the edge-based recommender system 106 generates the updated digital item recommendation utilizing the recommendation score and the additional recommendation score by generating the updated digital item recommendation to recommend the additional digital item stored with the additional coagent recommendation model based on the recommendation score and the additional recommendation score.

In some implementations, the edge-based recommender system 106 further determines one or more user attributes associated with a client device corresponding to the digital item recommendation. Accordingly, in some embodiments, the edge-based recommender system 106 determines, utilizing the local coagent recommendation model, the recommendation score for the digital item based on the one or more item features of the digital item by determining, utilizing the local coagent recommendation model, the recommendation score for the digital item based on the one or more item features of the digital item and the one or more user attributes associated with the client device. In at least one embodiment, the edge-based recommender system 106 determines the one or more user attributes associated with the client device corresponding to the digital item recommendation by determining a query submitted by the client device requesting one or more digital items.

In some cases, the edge-based recommender system 106 generates the updated digital item recommendation utilizing the recommendation score and the additional recommendation score by generating the updated digital item recommendation utilizing an additional local coagent recommendation model based on the recommendation score and the additional recommendation score.

In one or more embodiments, the edge-based recommender system 106 further generates recommendations scores for provision to other edge computing devices of the distributed asynchronous coagent network. For instance, in some cases, the edge-based recommender system 106 receives, from the different edge computing device of the distributed asynchronous coagent network, one or more user attributes associated with a client device corresponding to an additional digital item recommendation; generates, utilizing the local coagent recommendation model, a further recommendation score for the digital item based on the one or more item features of the digital item; and provides the further recommendation score to the different edge computing device of the distributed asynchronous coagent network.

To provide an example of modifying the parameters of a local coagent recommendation model, in one or more embodiments, the edge-based recommender system 106 generates, utilizing the local coagent recommendation model, a recommendation score for the digital item; generates a digital item recommendation utilizing the recommendation score for the digital item and recommendation scores for additional digital items generated by one or more coagent recommendation models associated with one or more edge computing devices of the distributed asynchronous coagent network; determines a response to the digital item recommendation; and modifies parameters of the local coagent recommendation model utilizing a local policy gradient based on the response to the digital item recommendation. In some embodiments, the edge-based recommender system 106 modifies the parameters of the local coagent recommendation model utilizing the local policy gradient based on the response to the digital item recommendation by modifying parameters of a reinforcement learning model utilizing the local policy gradient based on the response to the digital item recommendation.

In one or more embodiments, the edge-based recommender system 106 generates the digital item recommendation as part of a sequence of digital item recommendations; determines the response to the digital item recommendation as part of a sequence of responses to the sequence of digital item recommendations; and modifies the parameters of the local coagent recommendation model utilizing the local policy gradient based on the response to the digital item recommendation by modifying the parameters of the local coagent recommendation model utilizing one or more local policy gradients based on the sequence of responses to the sequence of digital item recommendations.

In some cases, the edge-based recommender system 106 further determines an additional recommendation score for the digital item utilizing the local coagent recommendation model having the modified parameters; and generates an additional digital item recommendation utilizing the additional recommendation score from the local coagent recommendation model and the recommendation scores from the one or more coagent recommendation models associated with the one or more edge computing devices.

In some instances, the edge-based recommender system 106 further provides one or more gradients of the local coagent recommendation model to a hub computing device of the distributed asynchronous coagent network during a synchronization event; and updates the modified parameters of the local coagent recommendation model in response to receiving a parameter update from the hub computing device during the synchronization event, the parameter update based on the one or more gradients of the local coagent recommendation model and one or more additional gradients of the one or more coagent recommendation models.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
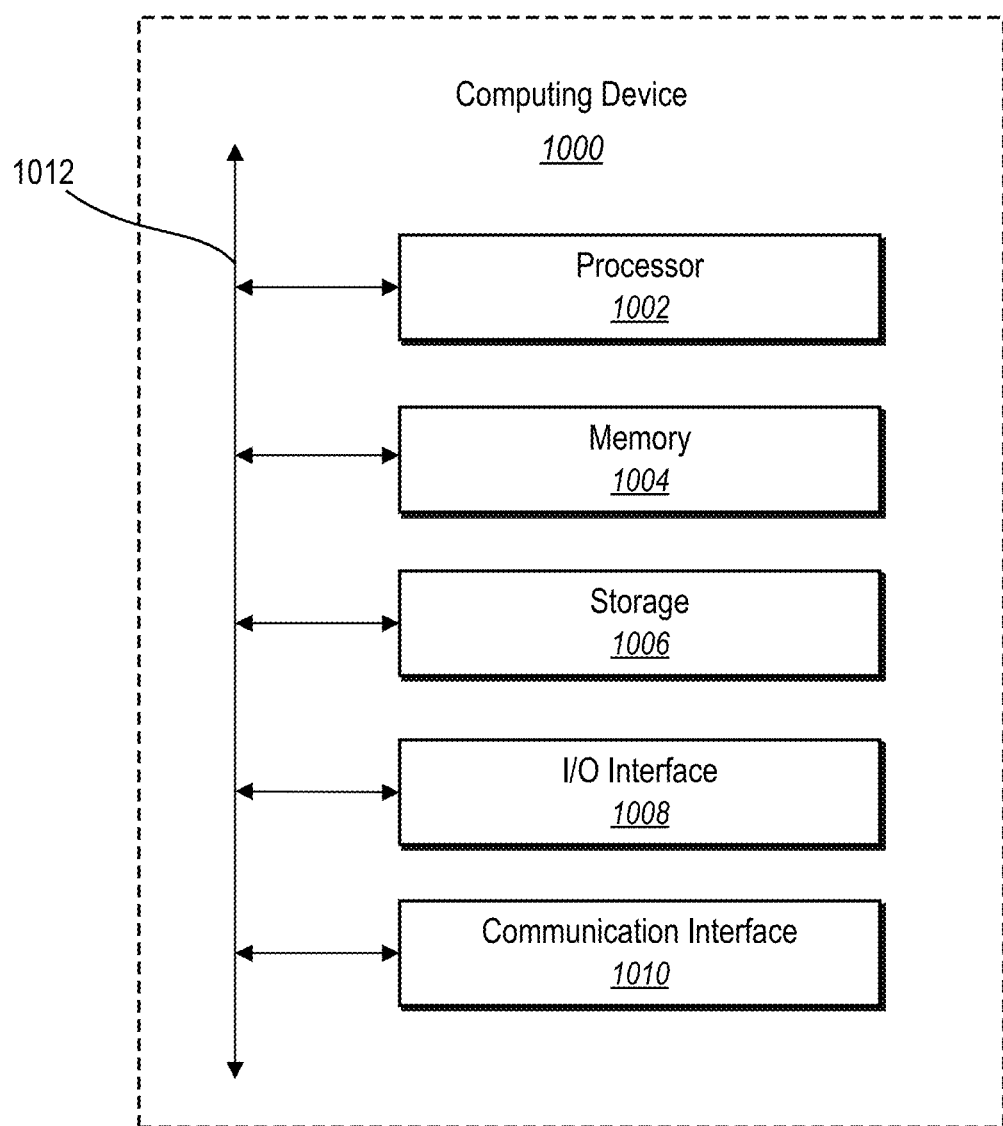
FIG. 10 illustrates a block diagram of an exemplary computing device in accordance with one or more embodiments.

FIG. 10 illustrates a block diagram of an example computing device 1000 that may be configured to perform one or more of the processes described above. One will appreciate that one or more computing devices, such as the computing device 1000 may represent the computing devices described above (e.g., the edge computing devices 102a-102n, the hub computing device 116, and/or the client devices 110a-110n). In one or more embodiments, the computing device 1000 may be a mobile device (e.g., a mobile telephone, a smartphone, a PDA, a tablet, a laptop, a camera, a tracker, a watch, a wearable device). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 including storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
synchronizing, during one or more synchronization events, edge computing devices that are geographically separated and part of a distributed asynchronous coagent network using a sequence of communications among the edge computing devices that facilitate synchronizing parameters of coagent recommendation models of the edge computing devices;

determining that an edge computing device of the distributed asynchronous coagent network is more geographically proximate to a client device than an additional edge computing device of the distributed asynchronous coagent network;

determining, at the edge computing device, a recommendation score for a digital item utilizing a local coagent recommendation model corresponding to the edge computing device and based on one or more item features of the digital item, the local coagent recommendation model having a set of parameters that were synchronized during the one or more synchronization events;

determining an initial digital item recommendation utilizing the recommendation score;

providing the initial digital item recommendation to the client device based on determining that the edge computing device is more geographically proximate to the client device than the additional edge computing device;

receiving, at the edge computing device and from a coagent recommendation model corresponding to an additional edge computing device of the distributed asynchronous coagent network, an additional recommendation score for an additional digital item associated with the additional edge computing device after a time delay from determining the recommendation score at the edge computing device due to a geographic separation between the edge computing device and the additional edge computing device that causes the edge computing device to be more geographically proximate to the client device than the additional edge computing device; and modifying, at the edge computing device and after providing the initial digital item recommendation to the client device, the initial digital item recommendation utilizing the recommendation score and the additional recommendation score.

2. The computer-implemented method of claim 1, wherein:

determining the recommendation score for the digital item utilizing the local coagent recommendation model corresponding to the edge computing device comprises determining the recommendation score for the digital item utilizing a reinforcement learning model corresponding to the edge computing device; and receiving, from the coagent recommendation model corresponding to the additional edge computing device, the additional recommendation score for the additional digital item comprises receiving the additional recommendation score from an additional reinforcement learning model corresponding to the additional edge computing device.

3. The computer-implemented method of claim 1, further comprising receiving, at the edge computing device and from the client device, a query for one or more digital items, wherein:

determining the initial digital item recommendation comprises determining the initial digital item recommendation at the edge computing device in response to receiving the query; and modifying the initial digital item recommendation at the edge computing device comprises modifying the initial digital item recommendation at the edge computing device in response to receiving the query.

4. The computer-implemented method of claim 1, further comprising:

determining, at the edge computing device, one or more user attributes associated with a client device corresponding to the initial digital item recommendation; and providing the one or more user attributes from the edge computing device to the additional edge computing device for generation of the additional recommendation score, wherein receiving, at the edge computing device and from the coagent recommendation model corresponding to the additional edge computing device, the additional recommendation score for the additional digital item comprises receiving, at the edge computing device, the additional recommendation score generated by the coagent recommendation model corresponding to the additional edge computing device using the one or more user attributes.

5. The computer-implemented method of claim 4, wherein:

providing the one or more user attributes from the edge computing device to the additional edge computing device for generation of the additional recommendation score comprises providing the one or more user attributes from the edge computing device to the additional edge computing device via a hub computing device that is geographically separated from the edge computing device and the additional edge computing device and facilitates communication between the geographically separated edge computing devices; and receiving the additional recommendation score from the coagent recommendation model corresponding to the additional edge computing device comprises receiving the additional recommendation score from the additional edge computing device via the hub computing device.

6. The computer-implemented method of claim 1, further comprising synchronizing parameters of the local coagent recommendation model corresponding to the edge computing device with parameters of the coagent recommendation model corresponding to the additional edge computing device at a plurality of synchronization events.

7. The computer-implemented method of claim 6, wherein synchronizing the parameters of the local coagent recommendation model with the parameters of the coagent recommendation model comprises modifying the parameters of the local coagent recommendation model utilizing a combination of one or more gradients associated with the local coagent recommendation model and one or more additional gradients associated with the coagent recommendation model.

8. The computer-implemented method of claim 6, further comprising modifying the parameters of the local coagent recommendation model based on responses to digital item recommendations utilizing one or more local policy gradients in between the plurality of synchronization events.

9. The computer-implemented method of claim 1, further comprising:

determining a context for the initial digital item recommendation; and determining a weight for at least one of the recommendation score from the local coagent recommendation model or the additional recommendation score from the coagent recommendation model corresponding to the additional edge computing device utilizing the context for the initial digital item recommendation.

10. A system comprising:

one or more memory devices; and one or more servers configured to cause the system to:

synchronize, during one or more synchronization events, edge computing devices that are geographically separated and part of a distributed asynchronous coagent network using a sequence of communications among the edge computing devices that facilitate synchronizing parameters of coagent recommendation models of the edge computing devices;

determine that an edge computing device of the distributed asynchronous coagent network is more geographically proximate to a client device than an additional edge computing device of the distributed asynchronous coagent network;

determine, at the edge computing device, a recommendation score for a digital item utilizing a local coagent recommendation model corresponding to the edge computing device and based on one or more item features of the digital item, the local coagent recommendation model having a set of parameters that were synchronized during the one or more synchronization events;
determine an initial digital item recommendation utilizing the recommendation score;
provide the initial digital item recommendation to the client device based on determining that the edge computing device is more geographically proximate to the client device than the additional edge computing device;
receive, at the edge computing device and from a coagent recommendation model corresponding to an additional edge computing device of the distributed asynchronous coagent network, an additional recommendation score for an additional digital item associated with the additional edge computing device after a time delay from determining the recommendation score at the edge computing device due to a geographic separation between the edge computing device and the additional edge computing device that causes the edge computing device to be more geographically proximate to the client device than the additional edge computing device; and
modify, at the edge computing device and after providing the initial digital item recommendation to the client device, the initial digital item recommendation utilizing the recommendation score and the additional recommendation score.

11. The system of claim 10, wherein the one or more servers are further configured to cause the system to:
determine the recommendation score for the digital item utilizing the local coagent recommendation model corresponding to the edge computing device by determining the recommendation score for the digital item utilizing a reinforcement learning model corresponding to the edge computing device; and
receive, from the coagent recommendation model corresponding to the additional edge computing device, the additional recommendation score for the additional digital item by receiving the additional recommendation score from an additional reinforcement learning model corresponding to the additional edge computing device.

12. The system of claim 10, wherein the one or more servers are further configured to cause the system to:
receiving, at the edge computing device and from a client device, a query for one or more digital items; and
determine the recommendation score utilizing the local coagent recommendation model corresponding to the edge computing device and receive the additional recommendation score from the coagent recommendation model corresponding to the additional edge computing device are in response to receiving the query.

13. The system of claim 10, wherein the one or more servers are further configured to cause the system to:
determine, at the edge computing device, one or more user attributes associated with a client device corresponding to the initial digital item recommendation; and
provide the one or more user attributes to the additional edge computing device for generation of the additional recommendation score.

14. The system of claim 10, wherein the one or more servers are further configured to cause the system to synchronize parameters of the local coagent recommendation model corresponding to the edge computing device with parameters of the coagent recommendation model corresponding to the additional edge computing device at a plurality of synchronization events.

15. The system of claim 14, wherein the one or more servers are further configured to cause the system to synchronize the parameters of the local coagent recommendation model with the parameters of the coagent recommendation model by modifying the parameters of the local coagent recommendation model utilizing a combination of one or more gradients associated with the local coagent recommendation model and one or more additional gradients associated with the coagent recommendation model.

16. The system of claim 14, wherein the one or more servers are further configured to cause the system to modify the parameters of the local coagent recommendation model based on responses to digital item recommendations utilizing one or more local policy gradients in between the plurality of synchronization events.

17. The system of claim 10, wherein the one or more servers are further configured to cause the system to:
determine a context for the initial digital item recommendation; and
determine a weight for at least one of the recommendation score from the local coagent recommendation model or the additional recommendation score from the coagent recommendation model corresponding to the additional edge computing device utilizing the context for the initial digital item recommendation.

18. A non-transitory computer-readable medium storing executable instructions which, when executed by a processing device, cause the processing device to perform operations comprising:
synchronizing, during one or more synchronization events, edge computing devices that are geographically separated and part of a distributed asynchronous coagent network using a sequence of communications among the edge computing devices that facilitate synchronizing parameters of coagent recommendation models of the edge computing devices;
determining that an edge computing device of the distributed asynchronous coagent network is more geographically proximate to a client device than an additional edge computing device of the distributed asynchronous coagent network;
determining, at the edge computing device, a recommendation score for a digital item utilizing a local coagent recommendation model corresponding to the edge computing device and based on one or more item features of the digital item, the local coagent recommendation model having a set of parameters that were synchronized during the one or more synchronization events;
determining an initial digital item recommendation utilizing the recommendation score;
providing the initial digital item recommendation to the client device based on determining that the edge computing device is more geographically proximate to the client device than the additional edge computing device;
receiving, at the edge computing device and from a coagent recommendation model corresponding to an additional edge computing device of the distributed asynchronous coagent network, an additional recommendation score for an additional digital item associated with the additional edge computing device after a time delay from determining the recommendation score at the edge computing device due to a geographic separation between the edge computing device and the additional edge computing device that causes the edge computing device to be more geographically proximate to the client device than the additional edge computing device; and modifying, at the edge computing device and after providing the initial digital item recommendation to the client device, the initial digital item recommendation utilizing the recommendation score and the additional recommendation score.

19. The non-transitory computer-readable medium of claim 18, wherein:

determining the recommendation score for the digital item utilizing the local coagent recommendation model corresponding to the edge computing device comprises determining the recommendation score for the digital item utilizing a reinforcement learning model corresponding to the edge computing device; and receiving, from the coagent recommendation model corresponding to the additional edge computing device, the additional recommendation score for the additional digital item comprises receiving the additional recommendation score from an additional reinforcement learning model corresponding to the additional edge computing device.

* * * * *